US009674629B2

(12) United States Patent
Hegarty et al.

(10) Patent No.: US 9,674,629 B2
(45) Date of Patent: Jun. 6, 2017

(54) MULTICHANNEL SOUND REPRODUCTION METHOD AND DEVICE

(75) Inventors: Patrick James Hegarty, Struer (DK); Jan Abildgaard Pedersen, Holstebro (DK)

(73) Assignee: Harman Becker Automotive Systems Manufacturing Kft, Szekesfehervar (HU)

( * ) Notice: Subject to any disclaimer, the term of this patent is extended or adjusted under 35 U.S.C. 154(b) by 242 days.

(21) Appl. No.: 13/581,629

(22) PCT Filed: Sep. 28, 2010

(86) PCT No.: PCT/EP2010/064369
§ 371 (c)(1), (2), (4) Date: Aug. 29, 2012

(87) PCT Pub. No.: WO2011/116839
PCT Pub. Date: Sep. 29, 2011

(65) Prior Publication Data

US 2013/0010970 A1 Jan. 10, 2013

(30) Foreign Application Priority Data

Mar. 26, 2010 (DK) ........................... PA 2010 00251

(51) Int. Cl.
*H04S 5/00* (2006.01)
*H04R 5/00* (2006.01)
(Continued)

(52) U.S. Cl.
CPC ............ *H04S 5/00* (2013.01); *H04R 2499/13* (2013.01); *H04S 3/00* (2013.01); *H04S 7/303* (2013.01);
(Continued)

(58) Field of Classification Search
USPC ....... 381/17, 310, 61, 18, 309, 1, 56, 19, 26
See application file for complete search history.

(56) References Cited

U.S. PATENT DOCUMENTS 5,068,897 A 11/1991 Yamato et al.
6,243,476 B1 * 6/2001 Gardner .................. H04S 1/007 381/1

(Continued)

FOREIGN PATENT DOCUMENTS

CN 101401456 4/2009
DK EP 1260119 B1 * 5/2006 ............. H04S 5/005

(Continued)

OTHER PUBLICATIONS

Chinese Office action issued in Chinese Application No. 201080065614.8 dated Jun. 17, 2014, which is a counter-part application having the same priority as the instant application; 9 pgs.

(Continued)

*Primary Examiner* — Duc Nguyen
*Assistant Examiner* — Yogeshkumar Patel
(74) *Attorney, Agent, or Firm* — Brooks Kushman P.C.

(57) ABSTRACT

Disclosed are methods for selecting auditory signal components for reproduction by means of one or more supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup. Also disclosed are devices for carrying out the above methods and systems of such devices.

22 Claims, 20 Drawing Sheets

(51) Int. Cl.
*H04S 3/00* (2006.01)
*H04S 7/00* (2006.01)
*G06F 3/0346* (2013.01)

(52) U.S. Cl.
CPC ....... *H04S 2400/05* (2013.01); *H04S 2400/09* (2013.01); *H04S 2400/11* (2013.01); *H04S 2420/01* (2013.01); *H04S 2420/05* (2013.01)

(56) References Cited

U.S. PATENT DOCUMENTS

| | | | | |
|---|---|---|---|---|
| 8,045,719 | B2 | 10/2011 | Vinton | |
| 2002/0150257 | A1* | 10/2002 | Wilcock ............... | G11B 19/025 381/17 |
| 2005/0053249 | A1* | 3/2005 | Wu ......................... | H04S 5/005 381/310 |
| 2008/0298597 | A1 | 12/2008 | Turku et al. | |
| 2009/0252356 | A1* | 10/2009 | Goodwin ................ | H04S 1/002 381/310 |

FOREIGN PATENT DOCUMENTS

| | | |
|---|---|---|
| EP | 1260119 | 5/2006 |
| EP | 1881740 | 1/2008 |
| WO | 01/62045 | 8/2001 |
| WO | WO01/62045 | 8/2001 |
| WO | 2007/106324 | 9/2007 |
| WO | 2011/116839 | 9/2011 |

OTHER PUBLICATIONS

International Search Report from PCT/EP2010/064369 (published as WO 2011/116839) dated Dec. 22, 2010, 4 pages. The instant application is a national phase of PCT/EP2010/064369 (WO2011/116839).

"A Frequency-Domain Approach to Multichannel Upmix*"; Carlos Avendano and Jean-Marc Jot, Journal of the Audio Engineering Society, Audio Engineering Society, New York, NY, US, vol. 52, No. 7/08; Jul. 1, 2004; pp. 740-749.

"Spatial aspects of reproduced sound in small rooms"; Soren Bech; Acoustic Society of America; 1998; pp. 434-445.

"Sound transmission to and within the human ear canal"; Dorte Hammershoi and H. Møeller; Acoustic Society of America; 1996; pp. 408-427.

"The CIPIC HRTF Database"; V.R. Algazi, R.O. Duda and D.M. Thompson; C. Avendano; IEEE Workshop on Applications of Signal Processing to Audio and Acoustics; Oct. 21-24, 2001; pp. 99-102.

"Inverse Filter of Sound Reproduction Systems Using Regularization"; Hironori Tokuno, Ole Kirkeby, Philip A. Nelson and Hareo Hamada; IEICE Trans. Fundamentals; vol. E-80-A, No. 5; May, 1997; pp. 809-820.

"How Drivers Sit in Cars"; S. Parkin, G.M. Mackay and A. Cooper; Accid. Anal. and Prev., vol. 27, No. 6; pp. 777-783; 1995.

"Auditory Scene Analysis"; Albert S. Bregman,The MIT Press, 1994, pp. 293-294.

"Spatial Hearing"; Jens Blauert, MIT Press, 1994, p. 209.

"Discrete-Time Signal Processing"; Allan V. Oppenheim and Ronald W. Schafer, Prentice-Hall, 1999, p. 48.

Communication Pursuant to Article 94(3) EPC from the European Patent Office dated Aug. 25, 2015, issued in co-pending European Patent Application No. 10765607.6 which claims the same priority as the instant application; 7 pgs.

"Head-related transfer function database and its analyses", XIE, BoSun, Zhong, XiaoLi, Rao, Dan and Liang, ZhiQiang; Science in China Series G: Physics, Mechanics & Astronomy; Jun. 2007; 14 pgs.

"Comparison of Different Methods for the Interpolation of Head-Related Transfer Functions", Klaus Hartung, Jonas Braasch and Susanne J. Sterbing; AES 16$^{th}$ International Conference; Mar. 1, 1999; 12 pgs.

* cited by examiner

MULTICHANNEL SOUND REPRODUCTION METHOD AND DEVICE

CROSS-REFERENCE TO RELATED APPLICATIONS

This patent application is a U.S. national stage filing under 35 U.S.C. §371 of International Application No. PCT/EP2010/064369 filed Sep. 28, 2010, and claims priority to Denmark Application No. PA 2010 00251 filed Mar. 26, 2010. The disclosures of the aforementioned applications are incorporated herein by reference in their entireties.

TECHNICAL FIELD

The present invention relates generally to the field of sound reproduction via a loudspeaker setup and more specifically to methods and systems for obtaining a stable auditory space perception of the reproduced sound over a wide listening region. Still more specifically, the present invention relates to such methods and systems used in confined surroundings, such as an automobile cabin.

BACKGROUND OF THE INVENTION

Stereophony is a popular spatial audio reproduction format. Stereophonic signals can be produced by in-situ stereo microphone recordings or by mixing multiple monophonic signals as is typical in modern popular music. This type of material is usually intended to be reproduced with a matched loudspeaker pair in a symmetrical arrangement as suggested in ITU-R BS.1116[1997] and ITU-R BS.775-1 [1994].

If the above recommendations are met, the listener will perceive an auditory scene, described in Bregman [1994], comprising various virtual sources, phantom images, extending, at least, between the loudspeakers. If one or more of the ITU recommendations are not met, a consequence can be a degradation of the auditory scene, see for example Bech [1998].

It is very typical to listen to stereophonic material in a car. Most modern cars are delivered equipped with a factory-installed sound system consisting of a stereo sound source, such as a CD player, and 2 or more loudspeakers.

However, when comparing the automotive listening scenario with the ITU recommendations, the following deviations from ideal conditions will usually exist:

(i) The listening positions are wrong;
(ii) The loudspeaker positions are wrong;
(iii) There are large reflecting surfaces close to the loudspeakers.

At least for these reasons, the fidelity of the auditory scene is typically degraded in a car.

It is understood that although in this specification reference is repeatedly made to audio reproduction in cars, the use of the principles of the present invention and the specific embodiments of systems and methods of the invention described in the following are not limited to automotive audio reproduction, but could find application in numerous other listening situations as well.

It would be advantageous to have access to reproduction systems and methods that, despite the above mentioned deviations from ideal listening conditions, would be able to render audio reproduction of a high fidelity.

Auditory reproduction basically comprises two perceptual aspects: (i) the reproduction of the timbre of sound sources in a sound scenario, and (ii) the reproduction of the spatial attributes of the sound scenario, e.g. the ability to obtain a stable localisation of sound sources in the sound scenario and the ability to obtain a correct perception of the spatial extension or width of individual sound sources in the scenario. Both of these aspects and the specific perceptual attributes characterising these may suffer degradation by audio reproduction in a confined space, such as the cabin of a car.

SUMMARY OF THE INVENTION

This section will initially compare and contrast stereo reproduction in an automotive listening scenario with on and off-axis scenarios in the free field. After this comparison follows an analysis of the degradation of the auditory scene in an automotive listening scenario in terms of the interaural transfer function of the human ear. After this introduction, there will be given a summary of the main principles of the present invention, according to which there is provided a method and a corresponding stereo to multi-mono converter device, by means of which method and device the locations of the auditory components of an auditory scene can be made independent of the listening position.

An embodiment of the invention will be described in the detailed description of the invention, which section will also comprise an evaluation of the performance of the embodiment of the stereo to multi-mono converter according to the invention by analysis of its output simulated with the aid of the Matlab software.

Ideal Stereo Listening Scenario

Two-channel stereophony (which will be referred to as stereo in the following) is one means of reproducing a spatial auditory scene by two sound sources. Blauert [1997] makes the following distinction between the terms sound and auditory:

Sound refers to the physical phenomena characteristic of events (for instance sound wave, source or signal).

Auditory refers to that which is perceived by the listener (for instance auditory image or scene).

This distinction will also be applied in the present specification.

Blauert [1997] defines spatial hearing as the relationship between the locations of auditory events and the physical characteristics of sound events.

The ideal relative positions, in the horizontal plane, of the listener and sound sources for loudspeaker reproduction of stereo signals are described in ITU-R BS.1116 [1997] and ITU-R BS.775-1 [1994] and are shown graphically in FIG. 1 that illustrates the ideal arrangement of loudspeakers and listener for reproduction of stereo signals.

The listener should be positioned at an apex of an equilateral triangle with a minimum of $d_l=d_r=d_{lr}=2$ metres. A loudspeaker should be placed at the other two apexes, respectively. These loudspeakers should be matched in terms of frequency response and power response. The minimum distance to the walls should be 1 metre. The minimum distance to the ceiling should be 1.2 metres.

In this specification, lower case variables will be used for time domain signals, e.g. x[n], and upper case variables will be used for frequency domain representations, e.g. X[k].

The sound signals $l_{ear}[n]$ and $r_{ear}[n]$ are referred to as binaural and will throughout this specification be taken to mean those signals measured at the entrance to the ear canals of the listener. It was shown by Hammershøi and Møller [1996] that all the directional information needed for localisation is available in these signals. Attributes of the difference between the binaural signals are called interaural. Referring to FIG. 1, consider the case where there is only one sound source, fed by the signal $l_{source}[n]$. In this case, the left ear is referred to as ipsilateral as it is in the same hemisphere, with respect to 0° azimuth or median line, as the source and $h_{LL}[n]$ is the impulse response of the transmission path between $l_{source}[n]$ and $l_{ear}[n]$. Similarly, the right ear is referred to as contralateral and $h_{RL}[n]$ is the impulse response of the transmission path between $l_{source}[n]$ and $r_{ear}[n]$. In the ideal case $\Theta_L=\Theta_R=30°$.

If this scenario was for a point source in the free field, then these impulse responses, or head-related transfer functions (HRTFs) in the frequency domain, would contain information about the diffraction, scattering, interference and resonance effects caused by the torso, head and pinnae (external ears) and differ in a way characteristic to the relative positions of the source and listener. The HRTFs used in the present invention are from the CIPIC Interface Laboratory [2004] database, and are specifically for the KEMAR® head and torso simulator with small pinnae. It is, however, understood that also other examples of head-related transfer functions can be used according to the invention, both such from real human ears, from artificial human ears (artificial heads) and even simulated HRTFs.

The frequency domain representations of these signals are calculated using the discrete Fourier transform, DFT, as formulated in the following six equations, these equations being referred to collectively as the Fourier analysis equation in Oppenheim and Schafer [1999, page 561].

$$L_{ear}[k] = \sum_{n=0}^{N-1} l_{ear}(n)e^{j(2\pi/N)kn}$$

$$R_{ear}[k] = \sum_{n=0}^{N-1} r_{ear}(n)e^{j(2\pi/N)kn}$$

$$L_{source}[k] = \sum_{n=0}^{N-1} l_{source}(n)e^{j(2\pi/N)kn}$$

$$R_{source}[k] = \sum_{n=0}^{N-1} r_{source}(n)e^{j(2\pi/N)kn}$$

$$H_{LL}[k] = \sum_{n=0}^{N-1} h_{LL}(n)e^{j(2\pi/N)kn}$$

$$H_{LR}[k] = \sum_{n=0}^{N-1} h_{LR}(n)e^{j(2\pi/N)kn}$$

The differences between the left and right ears are described by the interaural transfer function, $H_{IA}[k]$, defined in the following equation:

$$H_{IA}[k] = \frac{L_{source}[k]\cdot H_{LL}[k]}{L_{source}[k]\cdot H_{LR}[k]}$$

The binaural auditory system refers to the collection of processes that operate on the binaural signals to produce a perceived spatial impression. The fundamental cues evaluated are the interaural level difference, ILD, and the interaural time difference, ITD. These quantities are defined below.

The ILD refers to dissimilarities between $L_{ear}[k]$ and $R_{ear}[k]$ related to average sound pressure levels. The ILD is quantitatively described by the magnitude of $H_{IA}[k]$.

The ITD refers to dissimilarities between $L_{ear}[k]$ and $R_{ear}[k]$ related to their relationship in time. The ITD is quantitatively described by the phase delay of $H_{IA}[k]$. Phase delay at a particular frequency is the negative unwrapped phase divided by the frequency.

For the case where both $L_{source}[k]$ and $R_{source}[k]$ are present, the interaural transfer function is given by the following equation:

$$H_{IA}[k] = \frac{L_{source}[k]\cdot H_{LL}[k] + R_{source}[k]\cdot H_{RL}[k]}{L_{source}[k]\cdot H_{LR}[k] + R_{source}[k]\cdot H_{RR}[k]}$$

If the transmission paths are linear and time invariant, LTI, then their impulse responses can be determined independently and $H_{IA}[k]$ determined by superposition as in the above equation.

The power spectral density of a signal is the Fourier transform of its autocorrelation. The power spectral densities of $l_{source}[n]$ and $r_{source}[n]$ can be calculated in the frequency domain as the product of the spectrum with its complex conjugate, as shown in the following equation:

$$P_L[k]=L_{source}[k]\cdot L_{source}[k]^*$$

$$P_R[k]=R_{source}[k]\cdot R_{source}[k]^*$$

Cross-power spectral density is the Fourier transform of the cross-correlation between two signals. The cross-power spectral density of $l_{source}[n]$ and $r_{source}[n]$ can be calculated in the frequency domain as the product of $L_{source}[k]$ and the complex conjugate of $R_{source}[k]$, as shown in the following equation:

$$P_{LR}[k]=L_{source}[k]\cdot R_{source}[k]^*$$

The coherence between $l_{source}[n]$ and $r_{source}[n]$ is an indication of the similarity between the two signals and takes a value between 0 and 1. It is calculated from the power spectral densities of the two signals and their cross-power spectral density. The coherence can be calculated in the frequency domain with equation (6) below. It is easy to show that $C_{LR}=1$ if a single block of data is used and therefore $C_{LR}$ is calculated over several blocks of signals being analysed.

$$C_{LR}[k] = \frac{|P_{LR}^2[k]|}{P_L[k]\cdot P_R[k]}$$

It is a requirement that $l_{source}[n]$ and $r_{source}[n]$ are jointly stationary stochastic processes. This means, autocorrelations and joint distributions should be invariant to time shift according to Shanmugan and Breipohl [1988].

When $l_{source}[n]$ and $r_{source}[n]$ are coherent and there is no ILD or ITD, and assuming free-field conditions and head and torso symmetry, then the magnitude and phase of $H_{IA}[k]=0$ as shown in FIG. 2. A positive ILD at some frequency would mean a higher level at that frequency in $l_{source}[n]$. Similarly, a positive ITD at some frequency would mean that frequency occurred earlier in $l_{source}[n]$.

The output of a normal and healthy auditory system under such conditions is a single auditory image, also referred to as a phantom image, centered on the line of 0 degree azimuth on an arc segment between the two sources. A scenario such as this, where the sound reaching each ear is identical, is also referred to as diotic. Similarly, if there is a small ILD and/or ITD difference, then a single auditory image will still be perceived. The location of this image between the two sources is determined by the ITD and ILD. This phenomenon is referred to as summing localisation (Blauert [1997, page 209])—the ILD and ITD cues are "summed" resulting in a single perceptual event. This forms the basis of stereo as a means of producing a spatial auditory scene.

If the ITD exceeds approximately 1 ms, corresponding to a distance of approximately 0.34 m, then the auditory event will be localised at the earliest source. This is known as the law of the first wave front. Thus, only sound arriving at the ear within 1 ms of the initial sound is critical for localisation in stereo. This is one of the reasons for the ITU recommendations for the distance between the sources and the room boundaries. If the delay is increased further, a second auditory event will be perceived as an echo of the first.

Real stereo music signals can have any number of components, whose $C_{LR}[k]$ range between 0 and 1 as a function of time. When $L_{source}$ and $R_{source}$ are driven by a stereo music signal, the output of the binaural auditory system is an auditory scene occurring between the two sources, the extent and nature of which depends on the relationship between the stereo music signals.

Off-Axis Listening Scenario

In the preceding paragraphs on the ideal stereo listening scenario there has been considered a listening position symmetrically located with respect to the stereo sound sources. That is, the listener is located at the centre of the so-called "sweet spot", the area in a listening room where optimal spatial sound reproduction will take place. Depending on the distance between the sources, listening positions and room boundaries, the effective area of the "sweet spot" will vary, but it will be finite. For this reason it is typical for some listeners to be in an off-axis position. An example of an off-axis listening position is shown in FIG. 3.

In the following analysis, again point sources in a free field and symmetrical HRTF's are assumed.

With reference to FIG. 3, it is apparent that the propagation paths from the two sound sources to each respective ear are of different length, $d_l<d_r$. The typical distances in an automotive listening scenario are approximately $d_l=1$ m, $d_r=1.45$ m and $d_{lr}=1.2$ m. As $d_r-d_l=0.45$ m there is an immediate problem with the law of the first wave front, the consequence being that most of the auditory scene collapses to the left sound source. In addition to this, the angles $\Theta_L$ and $\Theta_R$ are no longer equal and so the binaural impulse responses will no longer be equal, that is $h_{LL}[n]\neq h_{RR}[n]$ and $h_{LR}[n]\neq h_{RL}[n]$. If the angles are estimated to be $\Theta_L=25°$ and $\Theta_R=35°$ and the binaural impulse responses are modified to simulate the delay and attenuation of the approximate path length difference, then the magnitude and phase of $H_{IA}[k]$ are as shown in FIG. 4.

Unlike in an on-axis listening position, when $l_{source}[n]$ and $r_{source}[n]$ are driven with an identical signal, in this case the auditory image is unlikely to be localised directly in front of the listener but will most likely be "skewed" to the left or even collapsed completely to the position of the left source. The timbre will also be affected as the ITD offset will create a comb filter as can be seen in the large peaks in the ILD plot shown in FIG. 4. For a real stereo music signal, the auditory scene will most likely not be reproduced accurately, as summing localisation is no longer based on the intended interaural cues. If there was only a single listener, then these effects could be corrected for using deconvolution using for example the method described by Tokuno, Kirkeby, Nelson and Hamada [1997].

Most real stereophonic listening scenarios differ from the ideal cases described above. Real loudspeakers are unlikely to have completely matched frequency and power responses due to manufacturing tolerances. Also, the position of the loudspeakers in real listening rooms may be close to obstacles and reflecting surfaces that may introduce frequency-dependent propagation paths that influence the magnitude and phase of $H_{IA}$. As mentioned, the ITU recommendations are intended to reduce such effects.

Although the present invention can be applied in many different surroundings, specifically stereo reproduction in an automotive cabin will be dealt with in detail in the following section.

In-Car Listening Scenario

Some of the differences between the automotive and the "ideal" stereo scenario will be briefly described below.

When electro-dynamic, piston, loudspeakers are used it is also typical that several transducers are used to reproduce the audio spectrum (20 Hz to 20 kHz). One reason for this is the increasing directivity of the sound pressure radiated by the piston as a function of frequency. This is significant for off-axis listening as mentioned above. The cone of this type of loudspeaker also stops moving as a piston at high frequencies as wave propagation occurs on the piston (loudspeaker membrane), thus creating distortion. This phenomenon is referred to as cone break-up.

Loudspeakers are typically installed behind grills, inside various cavities in the car body. As such, the sound may move through several resonant systems. A loudspeaker will also likely excite other vibrating systems, such as door trims, that radiate additional sound. The sources may be close to the boundaries of the cabin and other large reflecting surfaces may be within 0.34 m to a source. This will result in reflections arriving within 1 ms of the direct sound influencing localisation. There may be different obstacles in the path of sources for the left signal compared to the right signal (for example the dashboard is not symmetrical due to the instrument cluster and steering wheel). Sound-absorbing material such as carpets and foam in the seats is unevenly distributed throughout the space. At low frequencies, approximately between 65 and 400 Hz, the sound field in the vehicle cabin comprises various modes that will be more or less damped.

The result is that $l_{ear}[n]$ and $r_{ear}[n]$, respectively, will be the superpositions of multiple transmission paths from transducer through the cabin to the respective ear.

This situation is further complicated by the fact that there is no fixed listening position for all drivers and passengers and instead the concept of a listening area is used. The listening area coordinate system is shown in FIG. 5.

The "listening area" is an area of space where the listener's ears are most likely to be and therefore where the behaviour of the playback system is most critical. The location of drivers seated in cars is well documented, see for example Parkin, Mackay and Cooper [1995]. By combining the observational data for the 95'th percentile presented by Parkin et al. with the head geometry recommended in ITU-T P.58 [1996], the following listening window should include the ears of the majority of drivers. Reference is made to the example of automotive listening shown in FIG. 6.

Approximate distances from the origin of the driver's listening area, indicated as a rectangle around the listener's head in FIG. 6 are $d_l=1$ m, $d_r=1.45$ m and $d_{lr}=1.2$ m. The approximate distance between the centre of the driver's and passengers' listening area is $d_{listeners}=0.8$ m.

Interaural transfer functions, in four positions in an automotive "listening area", have been calculated from measurements made with an artificial head. FIG. 7 shows $H_{IA}$ in Position 1 (at the back of the driver's listening window), and in Position 2 (at the front of the driver's listening window). FIG. 8 shows $H_{LA}$ in Position 3 (at the back of the passengers' listening window), and in Position 4 (at the front of the passengers' listening window).

These plots reveal large magnitude and phase differences between the four different listening positions. It is impossible to correct these differences at more than one position, and at the other positions, deconvolution may even increase the differences and introduce other audible artefacts such as pre-ringing. The main point is that deconvolution is not a realistic solution to the degradation of the localisation in this scenario.

Stereo to Multi-Mono Conversion

The preceding analysis demonstrates how off-axis listening positions change the interaural transfer function under stereo reproduction. The small listening area over which the auditory scene will be perceived as intended is a limitation of stereophony as a means of spatial sound reproduction. A solution to this problem was proposed by Pedersen in EP 1 260 119 B1.

The solution proposed in the above document consists of the derivation of a number of sound signals from a stereo signal such that each of these signals can be reproduced via one or more loudspeakers placed at the position of those phantom sources that would have been created if stereo signals were reproduced by the ideal stereo setup described above. This stereo to multi-mono conversion is intended to turn phantom sources into real sources thereby making their location independent on the listening position. The stereo signals are analysed and the azimuthal location of their various frequency components are estimated from the interchannel magnitude and phase differences as well as the interchannel coherence.

On the above background it is an object of the present invention to provide a method and a corresponding system or device that creates a satisfactory reproduction of a given auditory scene not only at a chosen preferred listening position but more generally throughout larger portions of a listening room, particularly, but not exclusively, throughout the cabin of an automobile.

The above and other objects and advantages are according to the present invention attained by the provision of a stereo to multi-mono conversion method and corresponding device or system, according to which the location of the phantom sources distributed over and constituting the auditory scene are estimated from binaural signals $l_{ear}[n]$ and $r_{ear}[n]$. In order to determine which loudspeaker should reproduce each individual component of the stereo signal, each loudspeaker is assigned a range of azimuthal angles to cover, which range could be inversely proportional to the number of loudspeakers in the reproduction system. ILD and ITD limits are assigned to each loudspeaker calculated from the head-related transfer functions over the same range of azimuthal angles. Each component of the stereo signal is reproduced by the loudspeaker, whose ILD and ITD limits coincide with the ILD and ITD of the specific signal component. As mentioned above, a high interchannel coherence between the stereo signals is required for a phantom source to occur and therefore the entire process is still scaled by this coherence.

Compared with the original stereo to multi-mono system and method described in the above mentioned EP 1 260 119 B1, the present invention obtains a better prediction of the position of the phantom sources that an average listener would perceive by deriving ITD, ILD and coherence not from the L and R signals that are used for loudspeaker reproduction in a normal stereo setup, but instead from these signals after processing through HRTF's, i.e. the prediction of the phantom sources is based on a binaural signal. A prediction of the most likely position of the phantom sources based on a binaural signal as used in the present invention has the very important consequence that localization of phantom sources anywhere in space, i.e. not only confined to a section in front of the listener and between the left and right loudspeaker in a normal stereophonic setup, can take place, after which prediction the particular signal components can be routed to loudspeakers placed anywhere around the listening area.

In a specific embodiment of the system and method according to the present invention, a head tracking device is incorporated such that the head tracking device can sense the orientation of a listener's head and change the processing of the respective signals for each individual loudspeaker in such a manner that the frontal direction of the listener's head corresponds to the frontal direction of the auditory scene reproduced by the plurality of loudspeakers. This effect is according to the invention provided by head tracking means that are associated with a listener providing a control signal for setting left and right angle limiting means, for instance as shown in the detailed description of the invention.

Although the present specification will focus on an embodiment of the stereo to multi-mono system and method applying three loudspeakers (Left, Centre and Right loudspeaker), it is possible according to the principles of the invention to scale the system and method to other numbers of loudspeakers, for instance to five loudspeakers placed around the listener in the horizontal plane through his ears as is known from a surround sound system used at home or from loudspeaker set-ups in automobiles. An embodiment of this kind will be described in the detailed description of the invention.

According to a first aspect of the present invention, there is thus provided a method for selecting auditory signal components for reproduction by means of one or more supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, the method comprising the steps of:

(i) specifying an azimuth angle range within which one of said supplementary sound reproducing transducers is located or is to be located and a listening direction;

(ii) based on said azimuth angle range and said listening direction, determining left and right interaural level difference limits and left and right interaural time difference limits, respectively;

(iii) providing a pair of input signals for said pair of primary sound reproducing transducers;

(iv) pre-processing each of said input signals, thereby providing a pair of pre-processed input signals;

(v) determining interaural level difference and interaural time difference as a function of frequency between said pre-processed signals; and (vi) providing those signal components of said input signals that have interaural level differences and interaural time differences in the interval between said left and right interaural level difference limits, and left and right interaural time difference limits, respectively, to the corresponding supplementary sound reproducing transducer.

According to a specific embodiment of the method according to the invention, those signal components that have interaural level and time differences outside said limits are provided to said left and right primary sound reproducing transducers, respectively.

According to another specific embodiment of the method according to the invention, those signal components that have interaural differences outside said limits are provided as input signals to means for carrying out the method according to claim 1.

According to a specific embodiment of the method according to the invention, said pre-processing means are head-related transfer function means, i.e. the input to the pre-processing means is processed through a function either corresponding to the head-related function (HRTF) of a real human being, the head-related transfer function of an artificial head or a simulated head-related function.

According to a presently preferred specific embodiment of the method according to the invention, the method further comprises determining the coherence between said pair of input signals, and wherein said signal components are weighted by the coherence before being provided to said one or more supplementary sound reproducing transducers.

According to still a further specific embodiment of the method according to the invention, the frontal direction relative to a listener, and hence the respective processing by said pre-processing means, such as head-related transfer functions, is chosen by the listener.

According to a specific embodiment of the method according to the invention, the frontal direction relative to a listener, and hence the respective processing by said pre-processing means, such as head-related transfer functions, is controlled by means of head-tracking means attached to a listener.

According to a second aspect of the present invention, there is furthermore provided a device for selecting auditory signal components for reproduction by means of one or more supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, wherein the device comprises:

(i) specification means, such as a keyboard or a touch screen, for specifying an azimuth angle range within which one of said supplementary sound reproducing transducers is located or is to be located, and for specifying a listening direction;

(ii) determining means that based on said azimuth angle range and said listening direction, determines left and right interaural level difference limits and left and right interaural time difference limits, respectively;

(iii) left and right input terminals providing a pair of input signals for said pair of primary sound reproducing transducers;

(iv) pre-processing means for pre-processing each of said input signals provided on said left and right input terminals, respectively, thereby providing a pair of pre-processed input signals;

(v) determining means for determining interaural level difference and interaural time difference as a function of frequency between said pre-processed input signals; and (vi) signal processing means for providing those signal components of said input signals that have interaural level differences and interaural time differences in the interval between said left and right interaural level difference limits, and left and right interaural time difference limits, respectively, to a supplementary output terminal for provision to the corresponding supplementary sound reproducing transducer.

According to an embodiment of the device according to the invention, those signal components that have interaural level and time differences outside said limits are provided to said left and right primary sound reproducing transducers, respectively.

According to another embodiment of the invention, those signal components that have interaural differences outside said limits are provided as input signals to a device as specified above, whereby it will be possible to set up larger systems comprising a number of supplementary transducers placed at locations around a listener. For instance, in a surround sound loudspeaker set-up comprising FRONT, LEFT, FRONT,CENTER, FRONT,RIGHT, REAR,LEFT and REAR,RIGHT primary loudspeakers, a system according to the invention could provide signals for instance for a loudspeaker placed between the FRONT,LEFT and REAR, LEFT primary loudspeakers and between the FRONT, RIGHT and REAR,RIGHT primary loudspeakers, respectively. Numerous other loudspeaker arrangements could be set up utilising the principles of the present invention, and such set-ups would all fall within the scope of the present invention.

According to a preferred embodiment of the invention said pre-processing means are head-related transfer function means.

According to still another, and at present also preferred, embodiment of the invention, the device comprises coherence determining means determining the coherence between said pair of input signals, and said signal components of the input signals are weighted by the inter-channel coherence between the input signals before being provided to said one or more supplementary sound reproducing transducers via said output terminal.

According to yet a further embodiment of the device according to the invention, the frontal direction relative to a listener, and hence the respective processing by said pre-processing means, such as head-related transfer functions, is chosen by the listener, for instance using an appropriate interface, such as a keyboard or a touch screen.

According to an alternative embodiment of the device according to the invention, the frontal direction relative to a listener, and hence the respective processing by said pre-processing means, such as head-related transfer functions, is controlled by means of head-tracking means attached to a listener or other means for determining the orientation of the listener relative to the set-up of sound reproducing transducers.

According to a third aspect of the present invention, there is provided a system for selecting auditory signal components for reproduction by means of one or more supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, the system comprising at least two of the devices according to the invention, wherein a first one of said devices is provided with first left and right input signals, and wherein the first device provides output signals on a left output terminal, a right output terminal and a supplementary output terminal, the output signal on the supplementary output terminal being provided to a supplementary sound reproducing transducer, and the output signals on the left and right output signals, respectively, are provided to respective input signals of a subsequent device according to the invention, whereby output signals are provided to respective transducers of a number of supplementary sound reproducing transducers. A non-limiting example of such a system has already been described above.

BRIEF DESCRIPTION OF THE DRAWINGS

The invention will be better understood by reading the following detailed description of an embodiment of the invention in conjunction with the figures of the drawing, where.

DETAILED DESCRIPTION OF THE INVENTION

Figure 1:
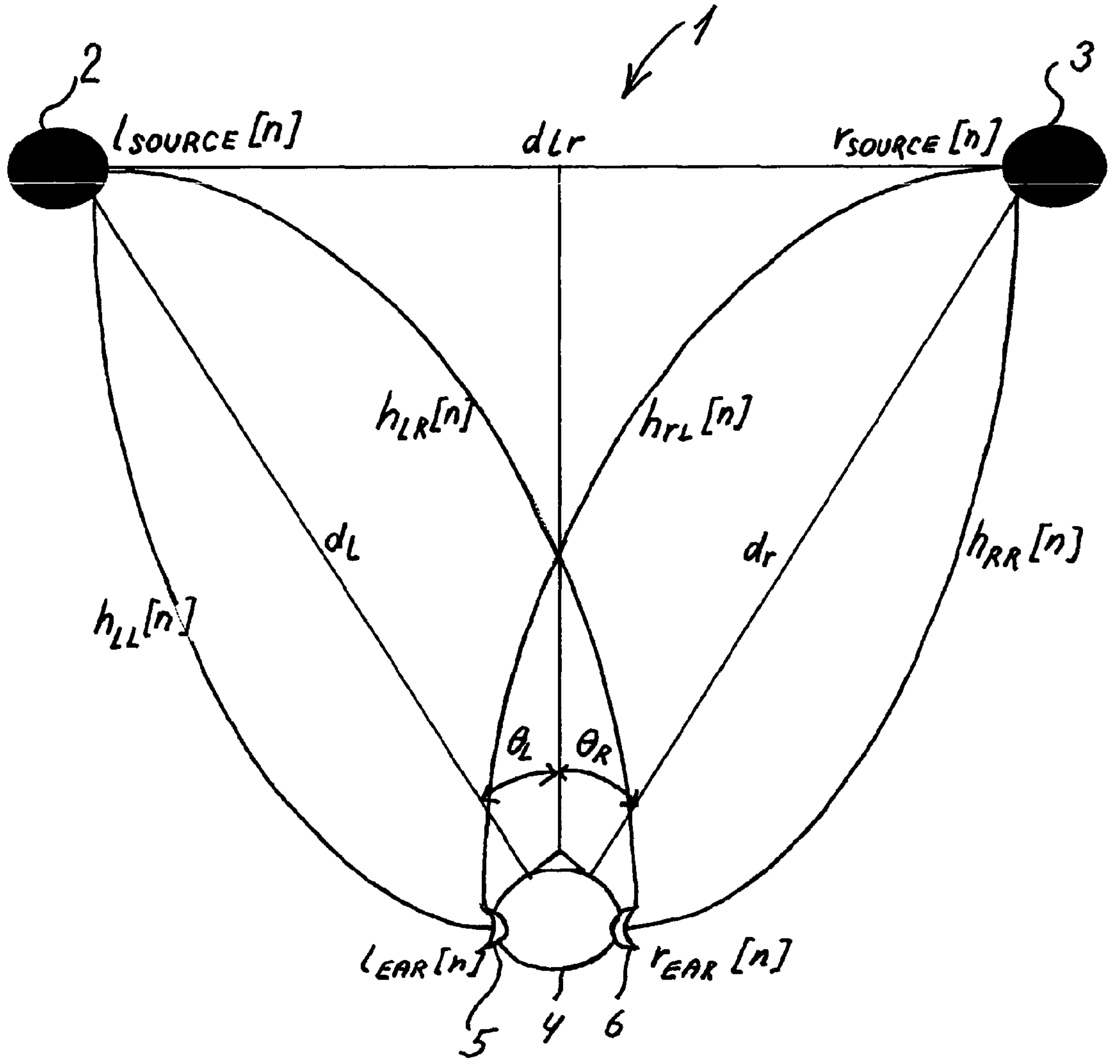
FIG. 1 illustrates an ideal arrangement of loudspeakers and listeners for reproduction of stereo signals.
Figure 2:
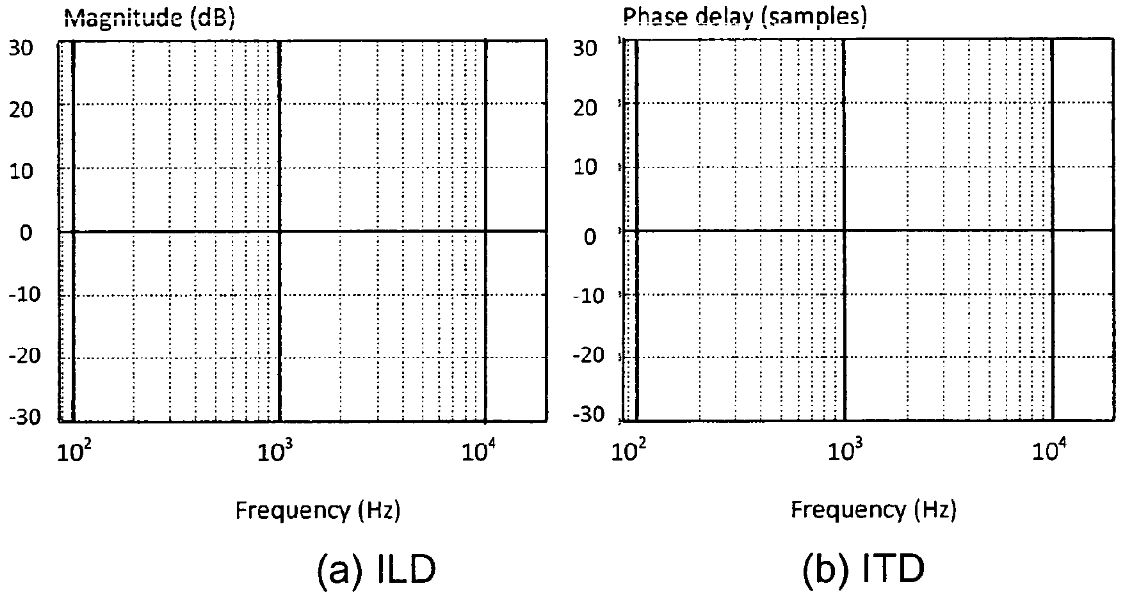
FIG. 2 shows (a) Interaural Level Difference (ILD), and (b) Interaural Time Difference as functions of frequency for ideal stereo reproduction.
Figure 3:
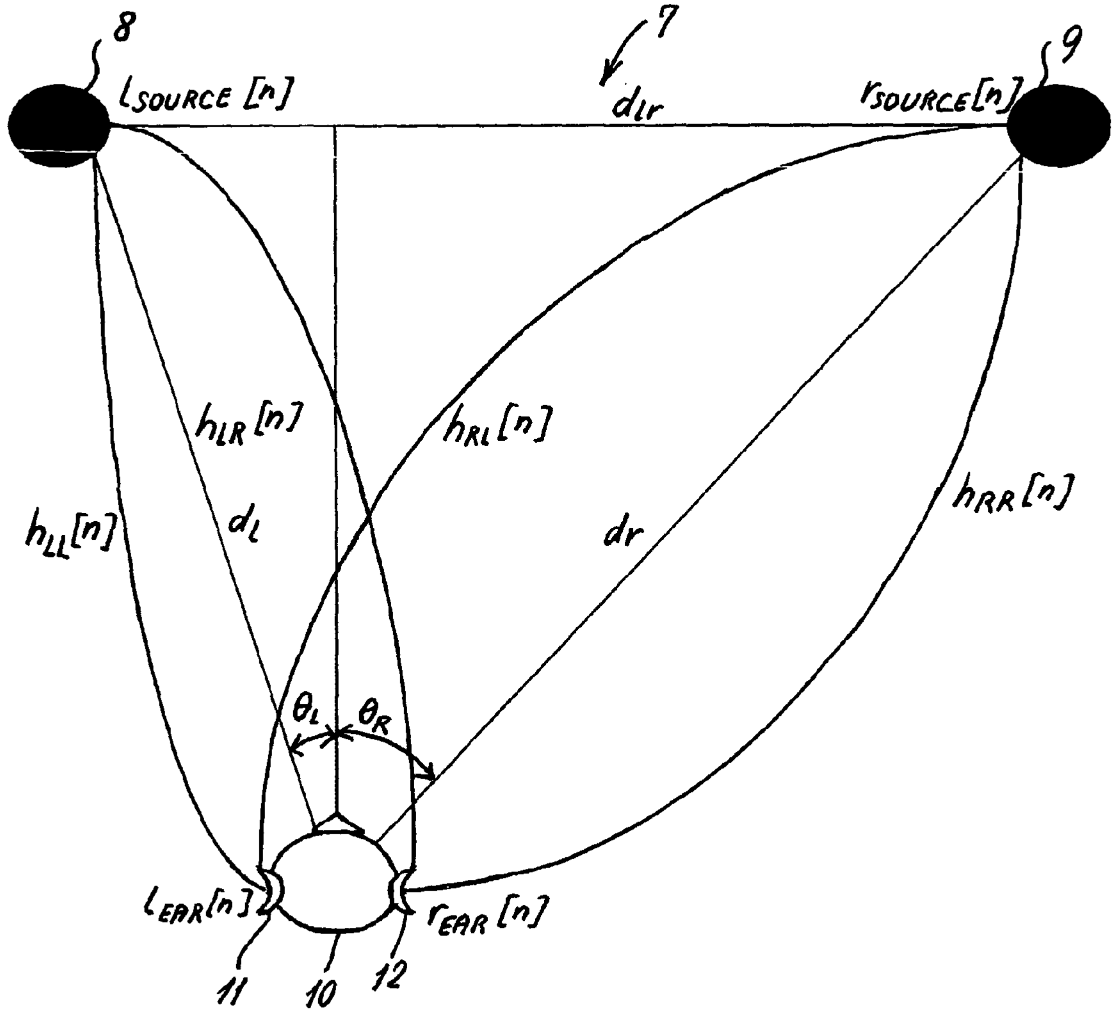
FIG. 3 illustrates the case of off-axis listening position with respect to a stereo loudspeaker pair.
Figure 4:
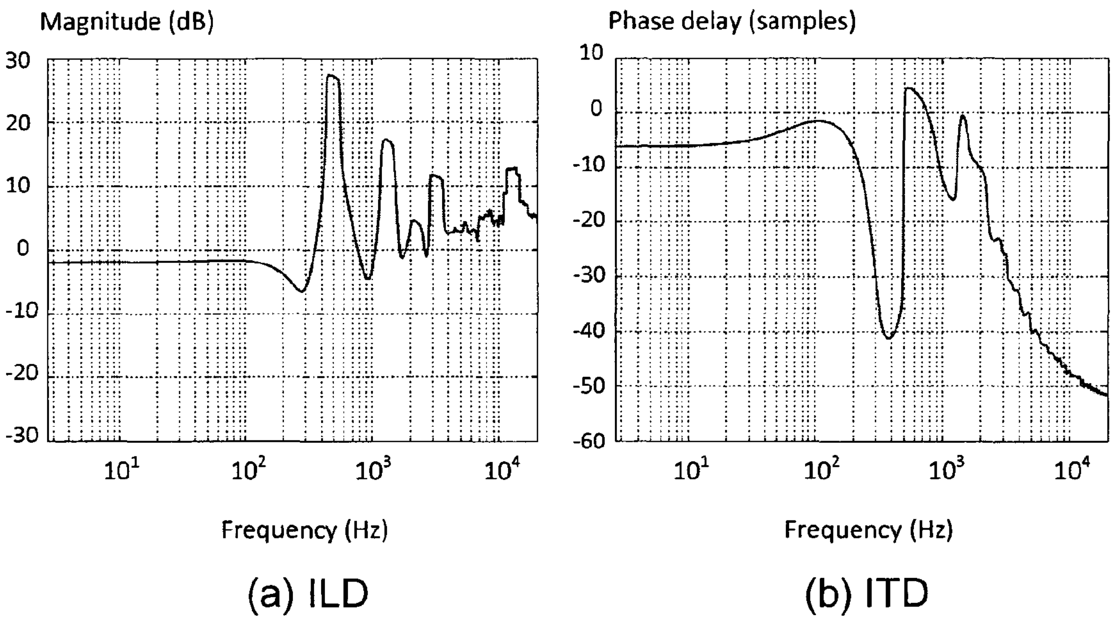
FIG. 4 shows (a) Interaural Level Difference (ILD), and (b) Interaural Time Difference as functions of frequency for off-axis listening.
Figure 5:
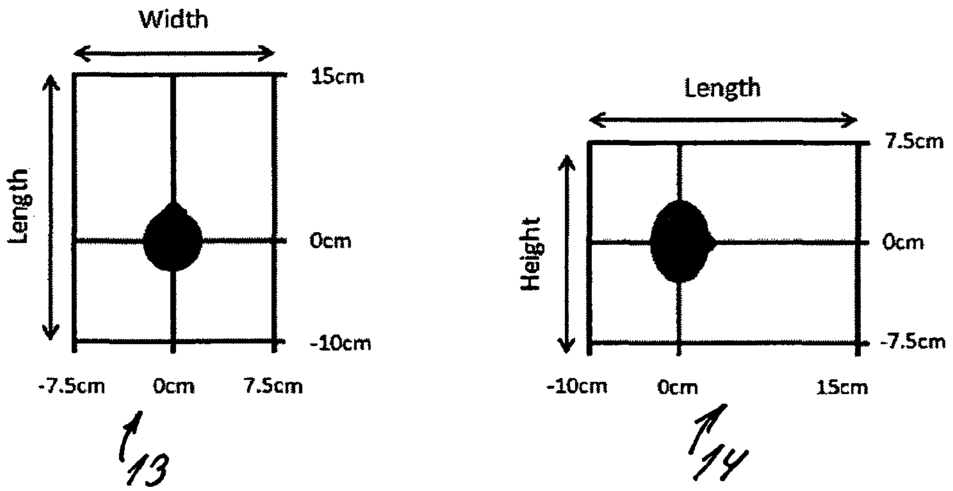
FIG. 5 shows listening area coordinate system and listener's head orientation.
Figure 6:
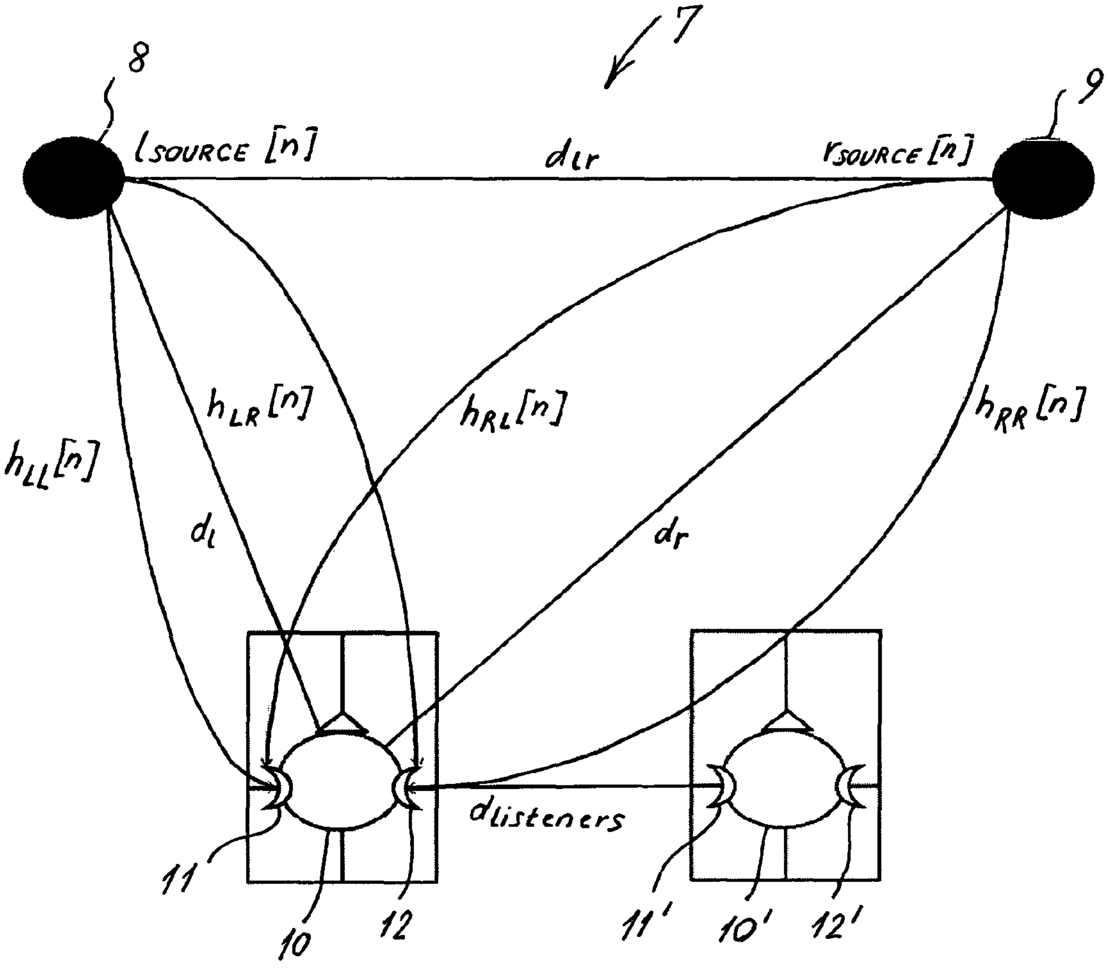
FIG. 6 illustrates an automotive listening scenario.
Figure 7:
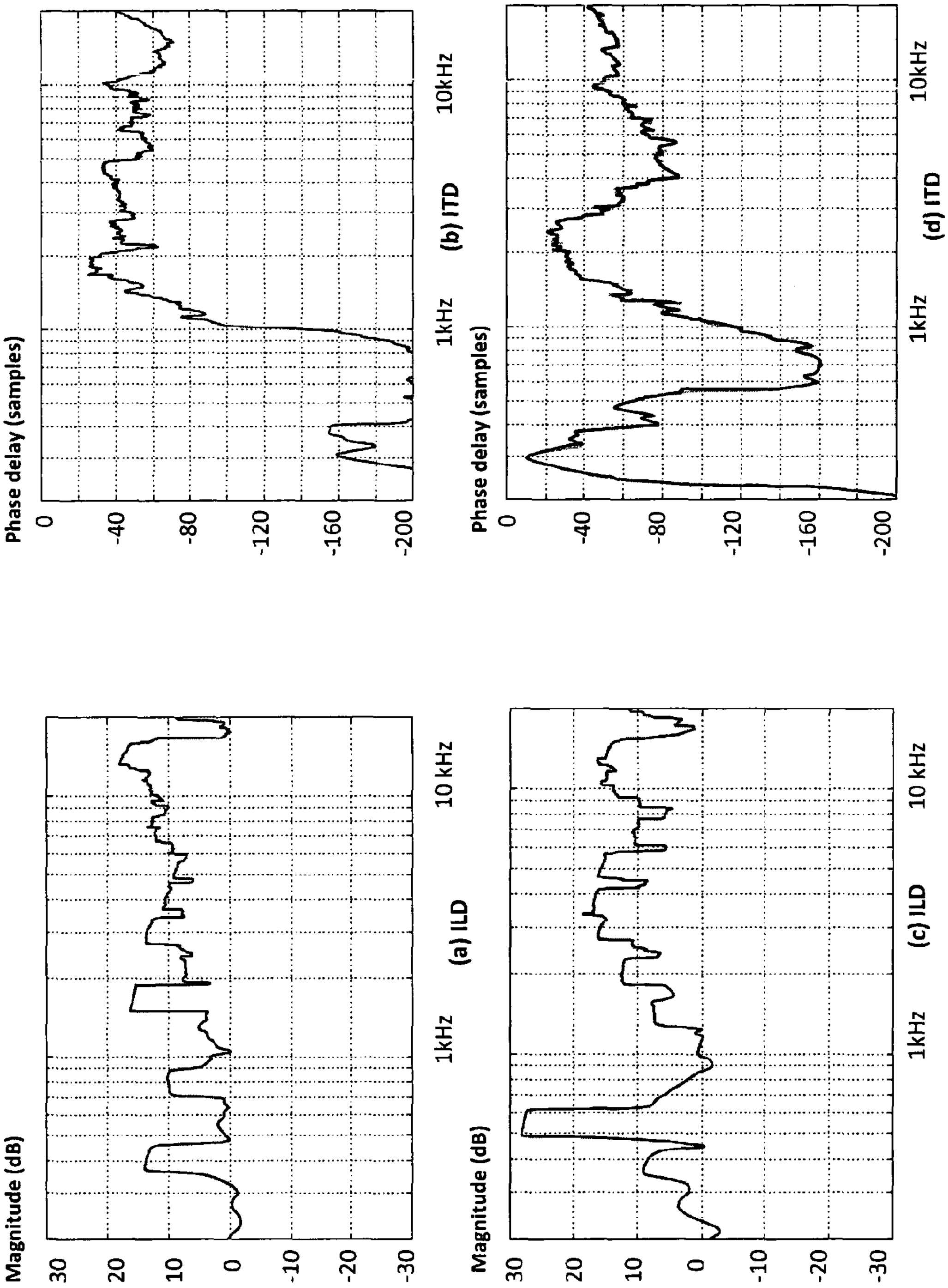
FIG. 7 shows (a) Position 1 ILD as a function of frequency, (b) Position 1 ITD as a function of frequency, (c) Position 2 ILD as a function of frequency, and (d) Position 2 ITD as a function of frequency.
Figure 8:
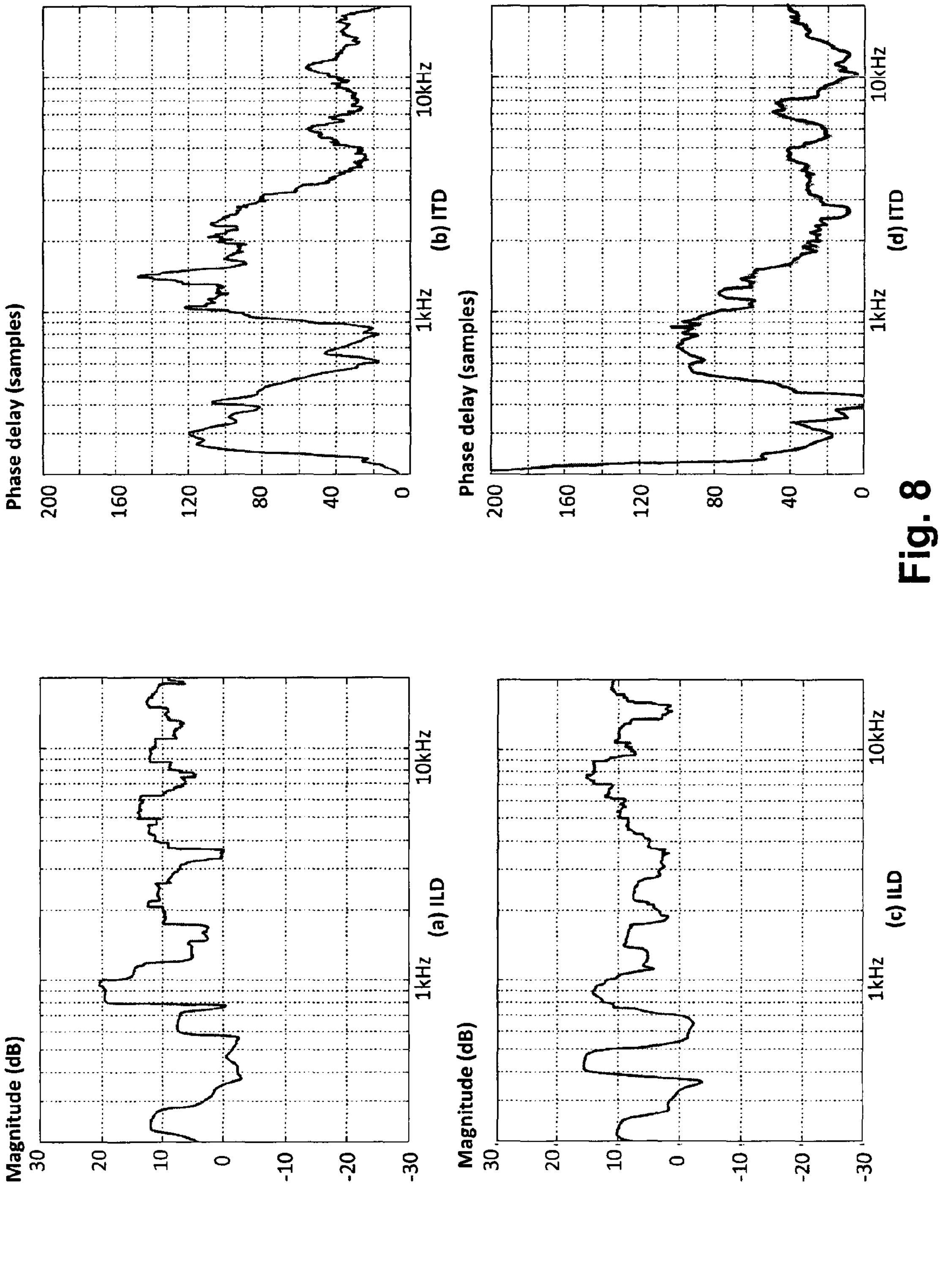
FIG. 8 shows for in-car listening (a) Position 3 ILD as a function of frequency, (b) Position 3 ITD as a function of frequency, (c) Position 4 ILD as a function of frequency, and (d) Position 4 ITD as a function of frequency.
Figure 9:
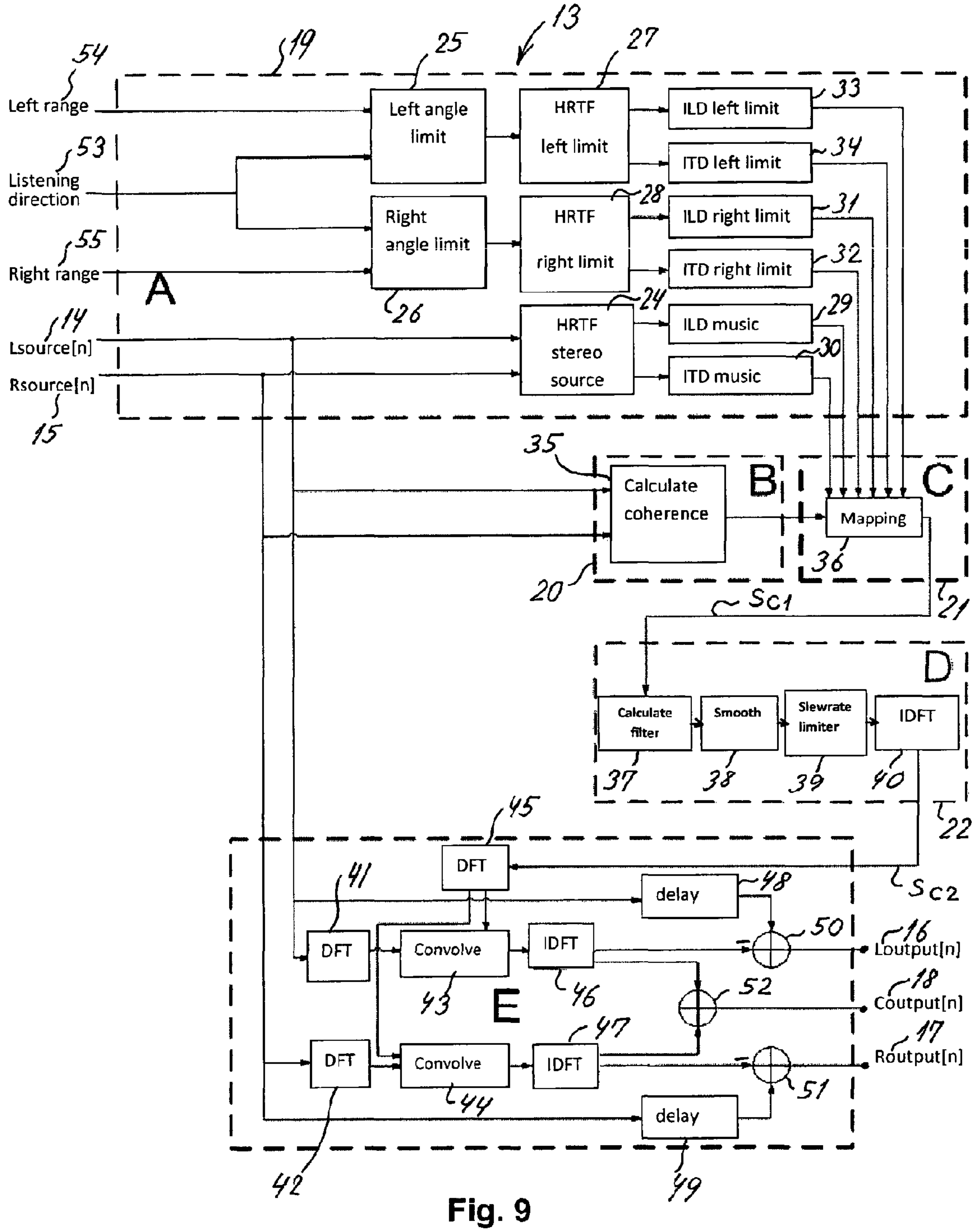
FIG. 9 shows a block diagram of a stereo to multi-mono converter according to an embodiment of the invention, comprising three output channels for a left loudspeaker, a centre loudspeaker and a right loudspeaker, respectively.
Figure 10:
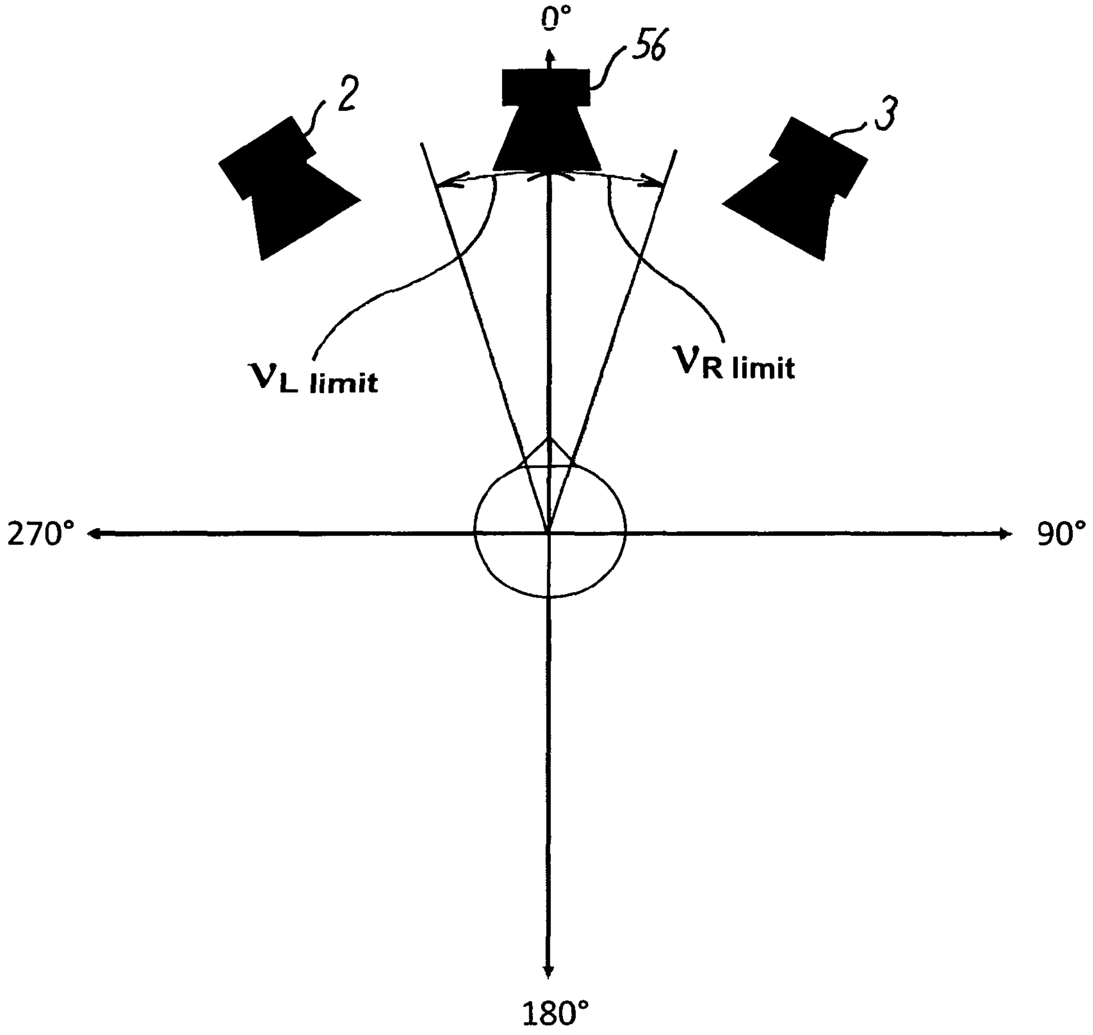
FIG. 10 shows an example of the location of centre loudspeaker and angle limits.
Figure 11:
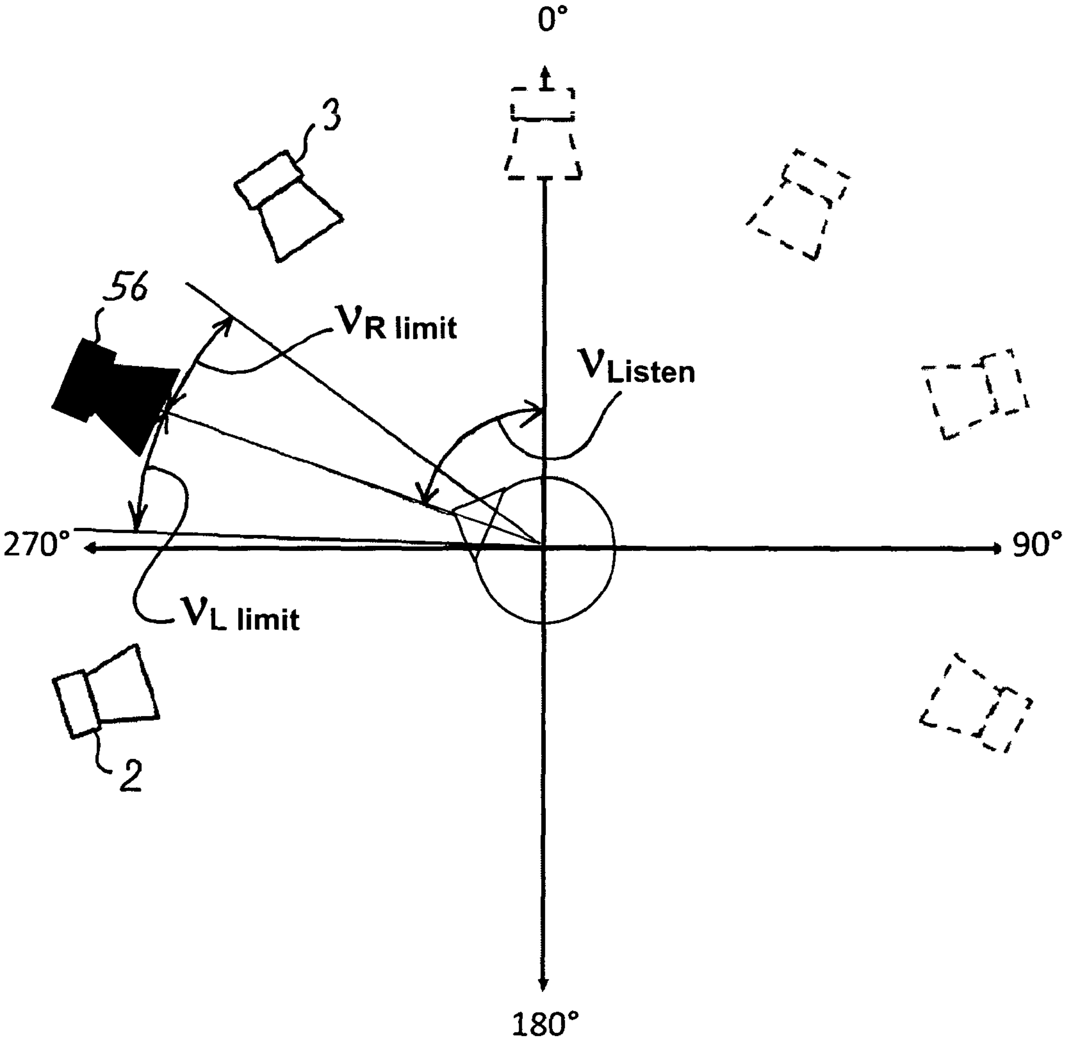
FIG. 11 shows the location of the centre loudspeaker and angle limits after listening direction has been rotated.

In the following, a specific embodiment of a device according to the invention, also termed a stereo to multi-mono converter, is described. In connection with the detailed description of this embodiment, specific numerical values for instance relating to respective angles in the loudspeaker set-up are used both in the text, figures and occasionally in various mathematical expressions, but it is understood that such specific values are only to be understood as constituting an example and that other parameter values will also be covered by the invention. The basic functional principle of this converter will be described with reference to the schematic block diagram shown in FIG. 9. While the embodiment shown in FIG. 9 is scalable to n loudspeakers, and can be applied to auditory scenes encoded with more than two channels, the embodiment described in the following provides extraction of a signal for one supplementary loudspeaker in addition to the left and right loudspeakers (the "primary" loudspeakers) of the normal stereophonic reproduction system. As shown in FIG. 11, the one supplementary loudspeaker 56 is in the following detailed description generally placed rotated relative to the 0° azimuth direction and in the median plane of the listener. The scenario shown in FIG. 10 constitutes one specific example, wherein $v_{listen}$ is equal to zero degrees azimuth.

Referring again to FIG. 9, the stereo to multi-mono converter (and the corresponding method) according to this embodiment of the invention comprises five main functions, labelled A to E in the block diagram.

In function block A, a calculation and analysis of binaural signals is performed in order to determine if a specific signal component in the incoming stereophonic signal $L_{source}[n]$ and $R_{source}[n]$ (reference numerals 14 and 15, respectively) is attributable to a given azimuth interval comprising the supplementary loudspeakers 56 used to reproduce the audio signal. Such an interval is illustrated in FIGS. 10 and 11 corresponding to the centre loudspeaker 56.

The input signal 14, 15 is in this embodiment converted to a corresponding binaural signal in the HRTF stereo source block 24 and based on this binaural signal, interaural level difference (ILD) and interaural time difference (ITD) for each signal component in the stereophonic input signal 14, 15 are determined in the blocks termed ILD music 29 and ITD music 30. In boxes 25 and 26, the left and right angle limits, respectively, are set (for instance as shown in FIGS. 10 and 11) based on corresponding input signals at terminals 54 (Left range), 53 (Listening direction) and 55 (Right range), respectively. The corresponding values of the HRTF's are determined in 27 and 28. These HRTF limits are converted to corresponding limits for interaural level difference and interaural time difference in blocks 31, 32, 33 and 34. The output from functional block A (reference numeral 19) is the ILD and ITD 29, 30 for each signal component of the stereophonic signal 14, 15 and the right and left ILD and ITD limits 31, 32, 33, 34. These output signals from functional block A are provided to the mapping function in functional block C (reference numeral 21), as described in the following.

The input stereophonic signal 14, 15 is furthermore provided to a functional block B (reference numeral 20) that calculates the inter-channel coherence between the left 14 and right 15 signals of the input stereophonic signal 14, 15. The resulting coherence is provided to the mapping function in block C.

The function block C (21) maps the interaural differences and coherence calculated in the function A (19) and B (20) into a filter D (22), which interaural differences and inter-channel coherence will be used to extract those components of the input signals $l_{source}$[n] and $r_{source}$[n] (14, 15) that will be reproduced by the centre loudspeaker. Thus, the basic concept of the extraction is that stereophonic signal components which with a high degree of probability will result in a phantom source being perceived at or in the vicinity of the position, at which the supplementary loudspeaker 56 is located, will be routed to the supplementary loudspeaker 56. What is meant by "vicinity" is in fact determined by the angle limits defined in block A (19), and the likelihood of formation of a phantom source is determined by the left and right inter-channel coherence determined in block 20.

The basic functions of the embodiment of the invention shown in FIG. 9 are described in more detail below. The specific calculations and plots relate to an example wherein a signal is extracted for one additional loudspeaker placed at zero degrees azimuth between a left and right loudspeaker placed at +/−30 degrees azimuth, respectively, this set-up corresponding to a traditional stereophonic loudspeaker set-up as shown schematically in FIG. 10. The corresponding values of the Left range, Listening position, and Right range input signals 54, 53, 55 are here chosen to be −10 degrees, 0 degrees, +10 degrees azimuth, corresponding to the situation shown in FIG. 10.

Function A: Calculation and Analysis of the Binaural Signals

The first step consists of calculating ear input signals $l_{ear}$[n] and $r_{ear}$[n] by convolving the input stereophonic signals $l_{source}$[n] and $r_{source}$[n] from the stereo signal source with free-field binaural impulse responses for sources at −30° ($h_{-30°L}$[n] and $h_{-30°R}$[n]) and at +30° ($h_{+30°r}$[n] and $h_{+30°L}$[n]). Time-domain convolution is typically formulated as a sum of the product of each sample of the first sequence with a time reversed version of the other second sequence shown in the following expression:

$$l_{ear}[n] = \sum_{k=-\infty}^{\infty} l_{source}[n]h_{-30degL}[n-k] + \sum_{k=-\infty}^{\infty} r_{source}[n]h_{+30degL}[n-k]$$

$$r_{ear}[n] = \sum_{k=-\infty}^{\infty} r_{source}[n]h_{+30degR}[n-k] + \sum_{k=-\infty}^{\infty} l_{source}[n]h_{-30degR}[n-k]$$

These signals correspond to the ear input signals in the case of ideal stereophony as described above.

The centre loudspeaker is intended to reproduce a portion of the auditory scene that is located between the Left angle limit, $v_{Llimit}$, and the Right angle limit, $v_{Rlimit}$ that are calculated from the angle variables Left range, Right range and Listening direction (also referred to as $v_{Lrange}$, $v_{Rrange}$ and $v_{Listen}$) as in the following equations:

$$\vartheta_{Llimit} = \vartheta_{Lrange} - \vartheta_{Listen}$$

$$\vartheta_{Rlimit} = \vartheta_{Rrange} - \vartheta_{Listen}$$

In the present specific example, $v_{Lrange}$, $v_{Rrange}$ are −/+10 degrees, respectively, and $v_{Listen}$ is 0 degrees.

If the playback system contains multiple loudspeakers, then the angle variables Left range, Right range and Listening direction allow the orientation and width of the rendered auditory scene to be manipulated. FIG. 11 shows an example where Listening direction is not zero degrees azimuth with the result being a rotation of the auditory scene to the left when compared to the scenario in FIG. 10. Changes to these variables could be made explicitly by a listener or could be the result of a listener position tracking vector (for instance a head-tracker worn by a listener).

Figure 30:
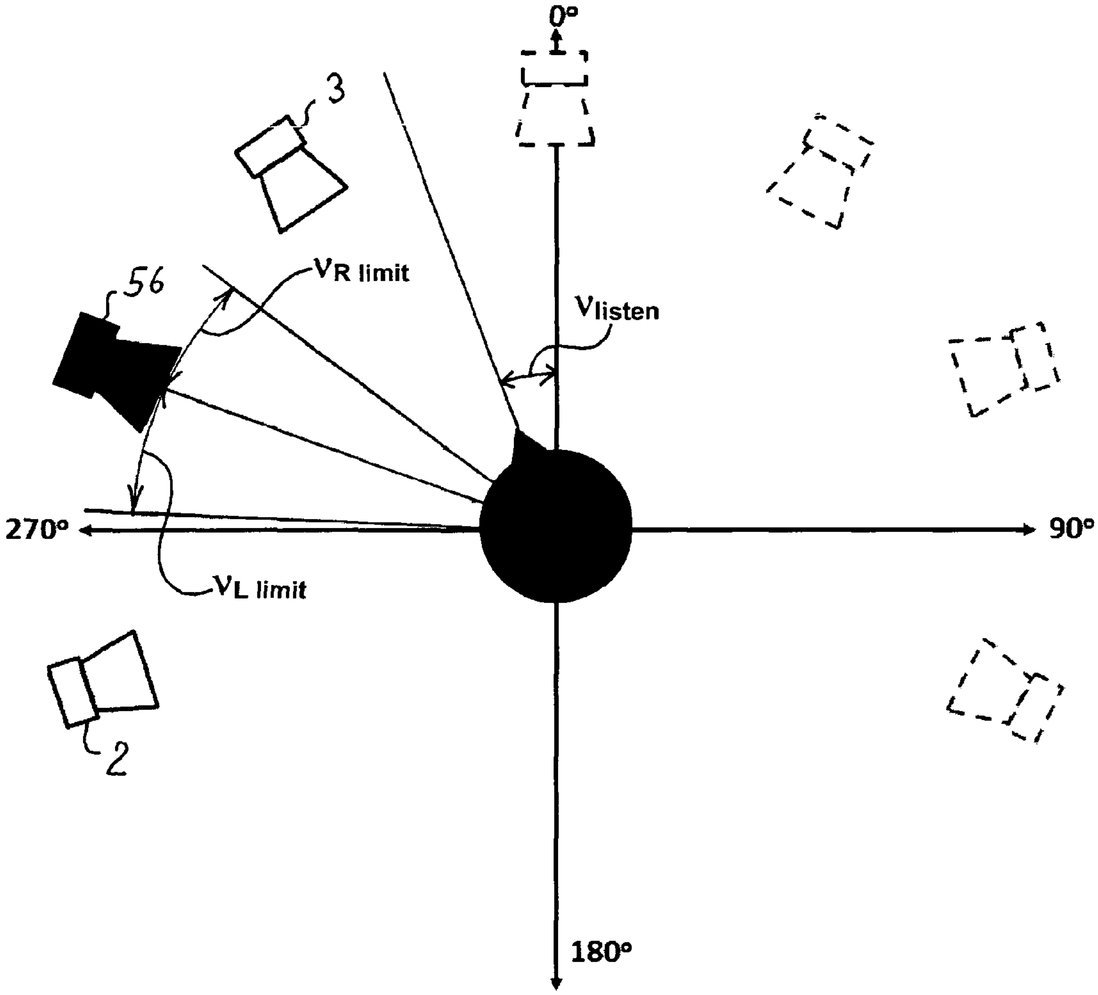
FIG. 30 shows the location of the centre loudspeaker and angle limits where the listening direction is outside the angular range between the pair of primary loudspeakers.

Furthermore, in FIG. 30 there is shown a more general situation, in which the listening direction is outside the angular range comprising the supplementary loudspeaker 56. Although not described in detail, this situation is also covered by the present invention.

The ILD and ITD limits in each case are calculated from the free-field binaural impulse responses for a source at $v_{Llimit}$ degrees, $h_{vLlimitdegL}$[n] and $h_{vLlimitdegR}$[n], and a source at $v_{Rlimit}$ degrees, $h_{vRlimitdegL}$[n] and $h_{RlimitdegR}$[n].

In the present embodiment, the remainder of the signal analysis in functions A through D operates on frequency domain representations of blocks of N samples of the signals described above. A rectangular window is used. In the examples described below N=512.

The frequency domain representations of a block of the ear input signals, music signals and the binaural impulse responses (for a source in the free-field at 0°—this processing is for the centre loudspeaker) are calculated using the DFT as formulated in the equations below:

$$L_{ear}[k] = \sum_{n=0}^{N-1} l_{ear}(n)e^{j(2\pi/N)kn}$$

$$R_{ear}[k] = \sum_{n=0}^{N-1} r_{ear}(n)e^{j(2\pi/N)kn}$$

$$L_{source}[k] = \sum_{n=0}^{N-1} l_{source}(n)e^{j(2\pi/N)kn}$$

$$R_{source}[k] = \sum_{n=0}^{N-1} r_{source}(n)e^{j(2\pi/N)kn}$$

$$H_{\vartheta_{Llimit}degL}[k] = \sum_{n=0}^{N-1} h_{\vartheta_{Llimit}degL}[n]e^{j(2\pi/N)kn}$$

$$H_{\vartheta_{Llimit}degR}[k] = \sum_{n=0}^{N-1} h_{\vartheta_{Llimit}degR}[n]e^{j(2\pi/N)kn}$$

$$H_{\vartheta_{Rlimit}degL}[k] = \sum_{n=0}^{N-1} h_{\vartheta_{Rlimit}degL}[n]e^{j(2\pi/N)kn}$$

$$H_{\vartheta_{Rlimit}degR}[k] = \sum_{n=0}^{N-1} h_{\vartheta_{Rlimit}degR}[n]e^{j(2\pi/N)kn}$$

Next, three interaural transfer functions are calculated as shown below:

$$H_{IAleftlimit}[k] = \frac{H_{\vartheta_{Llimit}degL}[k]}{H_{\vartheta_{Llimit}degR}[k]}$$

-continued $$H_{IArightlimit}[k] = \frac{H_{\vartheta_{Rlimit}degL}[k]}{H_{\vartheta_{Rlimit}degR}[k]}$$

$$H_{IAmusic}[k] = \frac{L_{ear}[k]}{R_{ear}[k]}$$

As mentioned above, $ILD_{leftlimit}$, $ILD_{rightlimit}$ and $ILD_{music}$ are calculated from the magnitude of the appropriate transfer function. Similarly, $ITD_{leftlimit}$, $ITD_{rightlimit}$ and $ITD_{music}$ are calculated from the phase of the appropriate transfer function.

Figure 12:
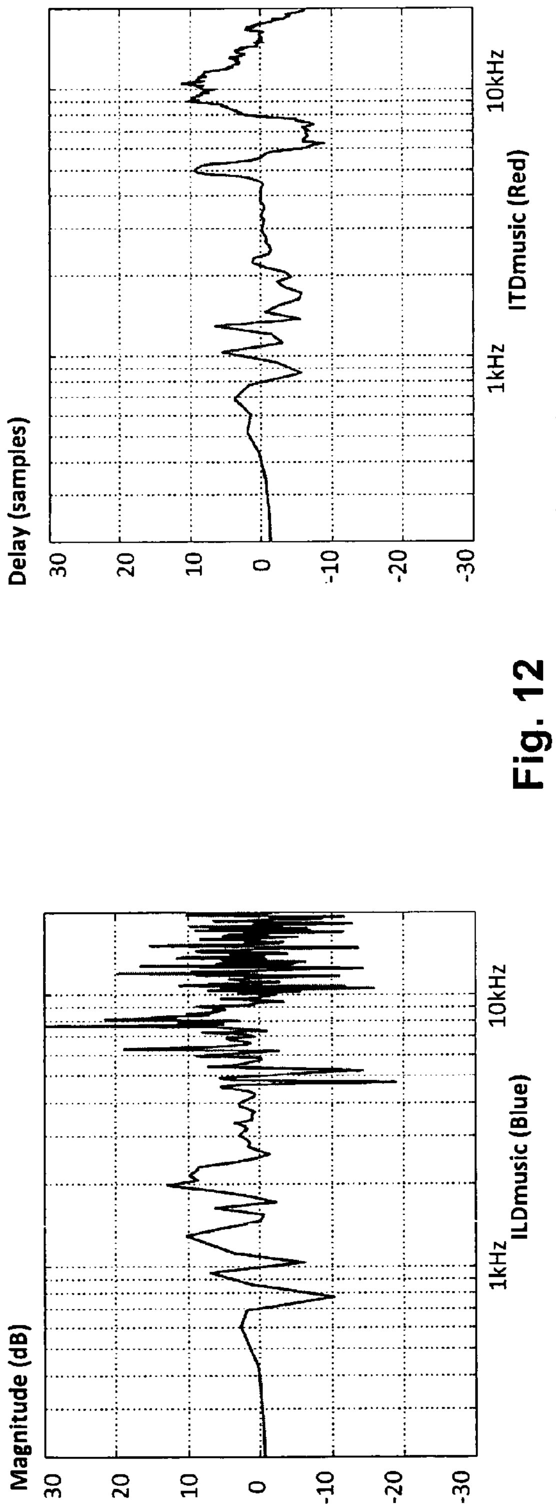
FIG. 12 shows (a) Magnitude of $H_{IAmusic}(f)$, (b) Phase delay of $H_{IAmusic}(f)$.

The centre frequencies, f, of each FFT bin, k, are calculated from the FFT size and sample rate. The music signal used for the examples below is samples n=2049:2560 of "Bird on a Wire" after the music begins. With reference to FIG. 12 there is shown $ILD_{music}$ and $ITD_{music}$.

Figure 13:
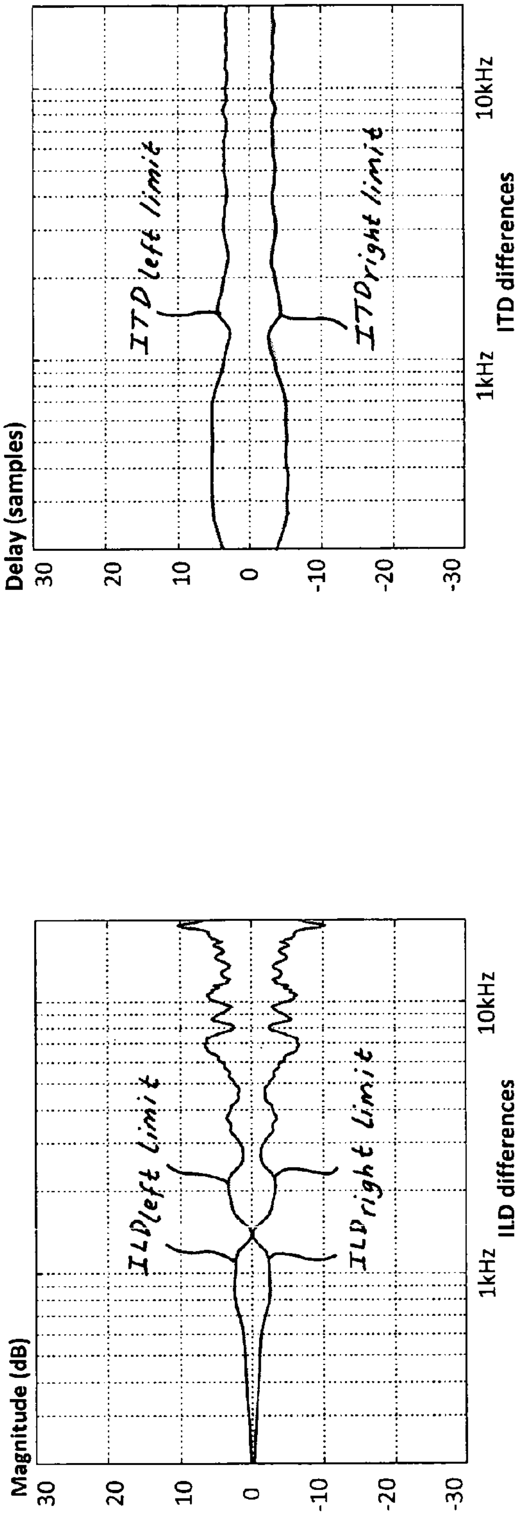
FIG. 13 shows (a) IDLleftlimit, (b) ILDrightlimit, (c) ITDleftlimit, and (d) ITDrightlimit.

With reference to FIG. 13 (left plot) there is shown $ILD_{leftlimit}$ and $ILD_{rightlimit}$.

These ILD and ITD functions are part of the input to the mapping step in Function Block C (reference numeral 21) in FIG. 9.

Function B: Calculation of the Coherence Between the Signals

The coherence between $l_{source}[n]$ and $r_{source}[n]$, which as mentioned above takes a value between 0 and 1, is calculated from the power spectral densities of the two signals and their cross-power spectral density.

The power spectral densities of $l_{source}[n]$ and $r_{source}[n]$ can be calculated in the frequency domain as the product of the spectrum with its complex conjugate as shown below:

$$P_{LL}[k]=L_{source}[k]\cdot L_{source}[k]^*$$

$$P_{RR}[k]=R_{source}[k]\cdot R_{source}[k]^*$$

The cross-power spectral density of $l_{source}[n]$ and $r_{source}[n]$ can be calculated in the frequency domain as a product of $L_{source}[k]$ and the complex conjugate of $R_{source}[k]$, as shown below:

$$P_{LR}[k]=L_{source}[k]\cdot R_{source}[k]^*$$

The coherence can be calculated in the frequency domain by means of the following equation:

$$C_{LR}[f] = \frac{|P_{LR}^2|}{P_{LL}\cdot P_{RR}}$$

$C_{LR}$ was calculated over 8 blocks in the examples shown here.

Figure 14:
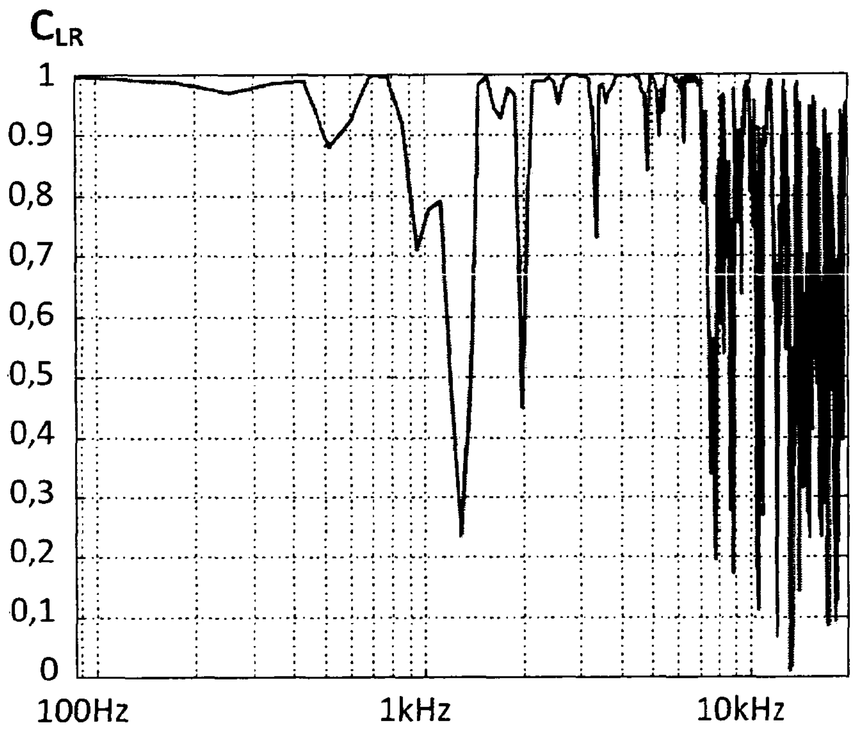
FIG. 14 shows the coherence between left and right channels for a block of 512 samples of Bird on a Wire.

$C_{LR}$ will be equal to 1 at all frequencies if $l_{source}[n]=r_{source}[n]$. If $l_{source}[n]$ and $r_{source}[n]$ are two independent random signals, then $C_{LR}$ will be close to 0 at all frequencies. The coherence between $l_{source}[n]$ and $r_{source}[n]$ for the block of music is shown in FIG. 14.

Function C: Mapping Interaural Differences and Coherence to a Filter

This function block maps the interaural differences and coherence calculated in the functions A and B into a filter that will be used to extract the components of $l_{source}[n]$ and $r_{source}[n]$ that will be reproduced by the centre loudspeaker. The basic idea is that the contributions of the ILD, ITD and interchannel coherence functions to the overall filter are determined with respect to some threshold that is determined according to the angular range intended to be covered by the loudspeaker. In the following, the centre loudspeaker is assigned the angular range of −10 to +10 degrees.

Mapping ILD to the Filter Magnitude

The ILD thresholds are determined from the free field interaural transfer function for sources at −10 and +10 degrees. Two different ways of calculating the contribution of ILD to the final filter are briefly described below.

Figure 15:
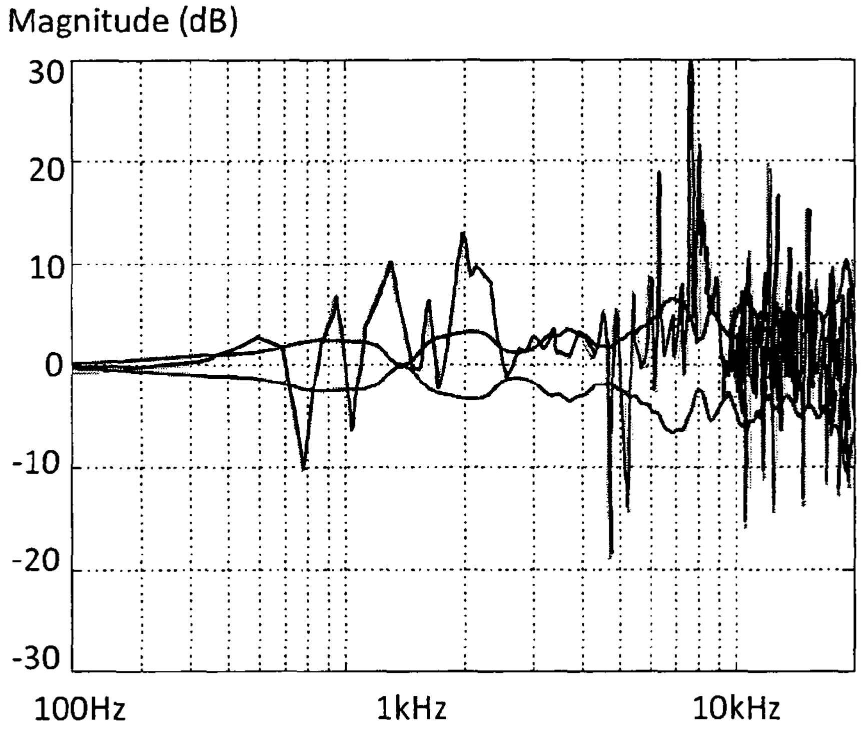
FIG. 15 shows ILD thresholds for sources at −10° and +10° and the magnitude of $H_{IAmusic}(f)$.
Figure 16:
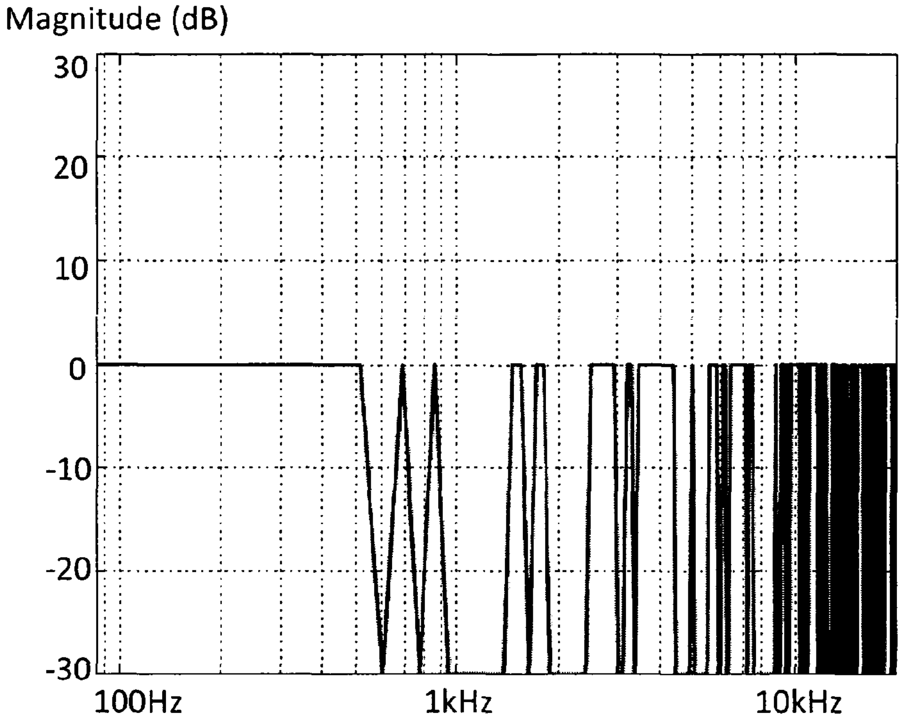
FIG. 16 shows mapping of $ILD_{music}$ to a filter.

In the first mapping approach, any frequency bins with a magnitude outside of the limits, as can be seen in FIG. 15, are attenuated. Ideally the attenuation should be infinite. In practice, the attenuation is limited to A dB, in the present example 30 dB, to avoid artefacts from the filtering such as clicking. These artefacts will be commented further upon below. This type of mapping of ILD to the filter is shown in FIG. 16.

Figure 17:
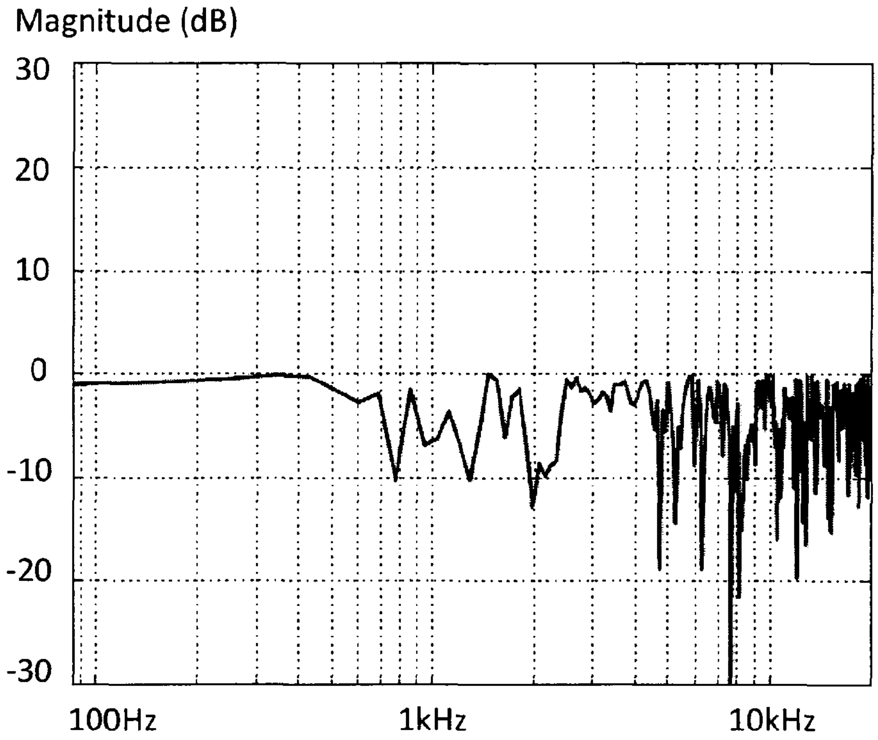
FIG. 17 shows mapping of $ILD_{music}$ to a filter.

An alternative method is simply to use the negative absolute value of the magnitude difference between $H_{IAff}[f]$ for a source at 0 degrees and $H_{IAmusic}[f]$ as the filter magnitude as shown in FIG. 17. In this way, the larger difference between $H_{IAmusic}[f]$ and $H_{IAff}[f]$, the more $H_{IAmusic}[f]$ is attenuated. There are no hard thresholds as in the method above and therefore some components will bleed into adjacent loudspeakers.

Mapping ITD to the Filter Magnitude

As in the previous section, the ITD thresholds are determined from the free field interaural transfer function for sources at −10 and +10 degrees, respectively. Again, two methods for including the contribution of ITD to the final filter are described below.

Figure 18:
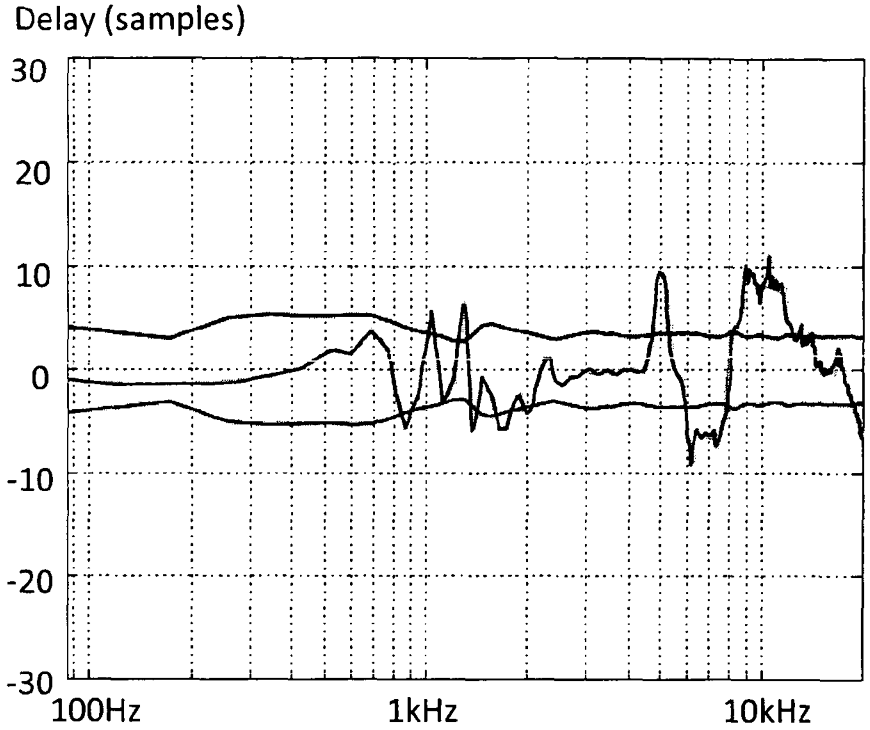
FIG. 18 shows ITD thresholds for sources at −10° and +10° and the phase delay of $H_{IAmusic}(f)$.

The phase difference between $H_{IAff}[f]$ for a source at 0 degrees and $H_{IAmusic}[f]$ is plotted with the ITD thresholds for the centre loudspeaker in FIG. 18.

Figure 19:
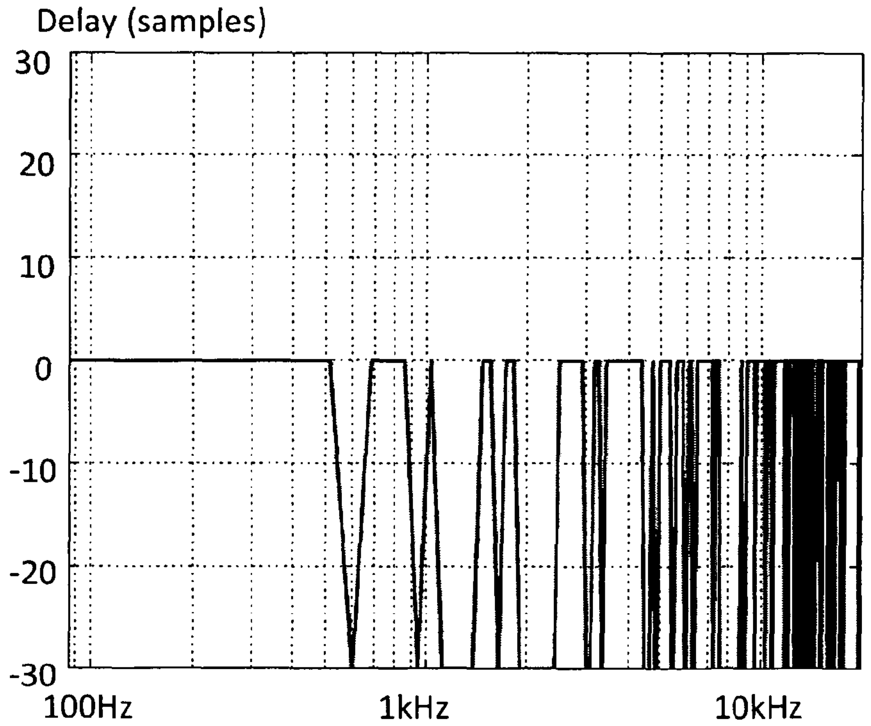
FIG. 19 shows mapping of $ITD_{music}$ to a filter.

The result of the first "hard threshold" mapping approach is the filter magnitude shown in FIG. 19. All frequency bins where the ITD is outside of the threshold set by free field sources at −10 and +10 degrees, respectively, are in this example attenuated by 30 dB.

Another approach is to calculate the attenuation at each frequency bin based on its percentage delay compared to free filed sources at −30 and +30 degrees, respectively. For example, if the maximum delay at some frequency was 16 samples and the ITD for the block of music was 4 samples, its percentage of the total delay would be 25%. The attenuation then could be 25% of the total. That is, if the total attenuation allowed was 30 dB, then the relevant frequency bin would be attenuated by 18 dB.

Figure 20:
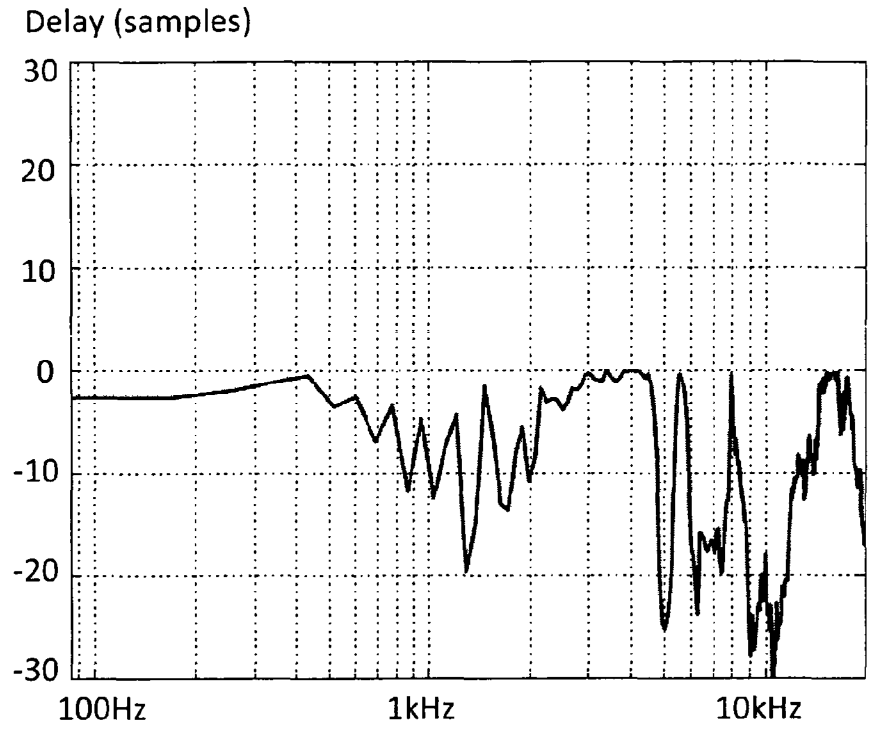
FIG. 20 shows mapping of $ITD_{music}$ to a filter.

An example of the filter magnitude designed in this way is shown in FIG. 20.

Mapping Coherence to the Filter Magnitude

As intensity and time panning function best for coherent signals, the operation of the stereo to multi-mono conversion should preferably take the coherence between $l_{source}[n]$ and $r_{source}[n]$ into account. When these signals are completely incoherent, no signal should be sent to the centre channel. If the signals are completely coherent and there is no ILD and ITD, then ideally the entire contents of $l_{source}[n]$ and $r_{source}[n]$ should be sent to the centre loudspeaker and nothing should be sent to the left and right loudspeakers.

The coherence is used in this implementation as a scaling factor and is described in the next section.

Function D: Filter Design

The basic filter for the centre loudspeaker, $H_{centre}[f]$, is calculated as a product of the ILD filter, ITD filter and coherence formulated in the equation below. It is important to note that this is a linear phase filter—the imaginary part of each frequency bin is set to 0 as it is not desired to introduce phase shifts into the music.

$$H_{center}[f]=ILDMAP_{centre}[f]\cdot ITDMAP_{centre}[f]\cdot C_{LR}[f]$$

Figure 21:
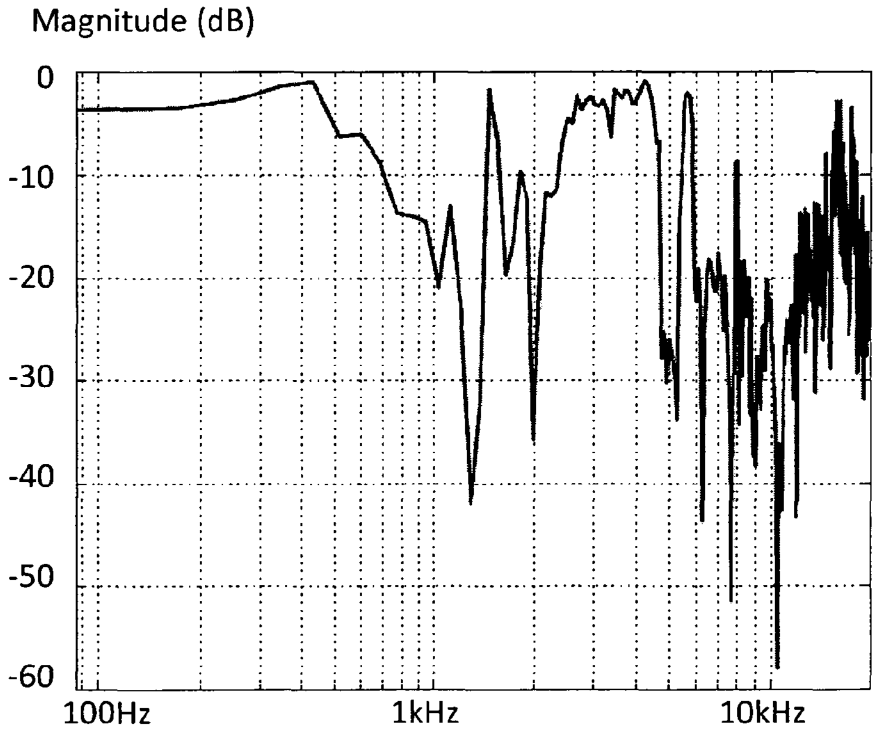
FIG. 21 shows the magnitude of $H_{center}(f)$.

The result is a filter with a magnitude like that shown in FIG. 21.

Figure 22:
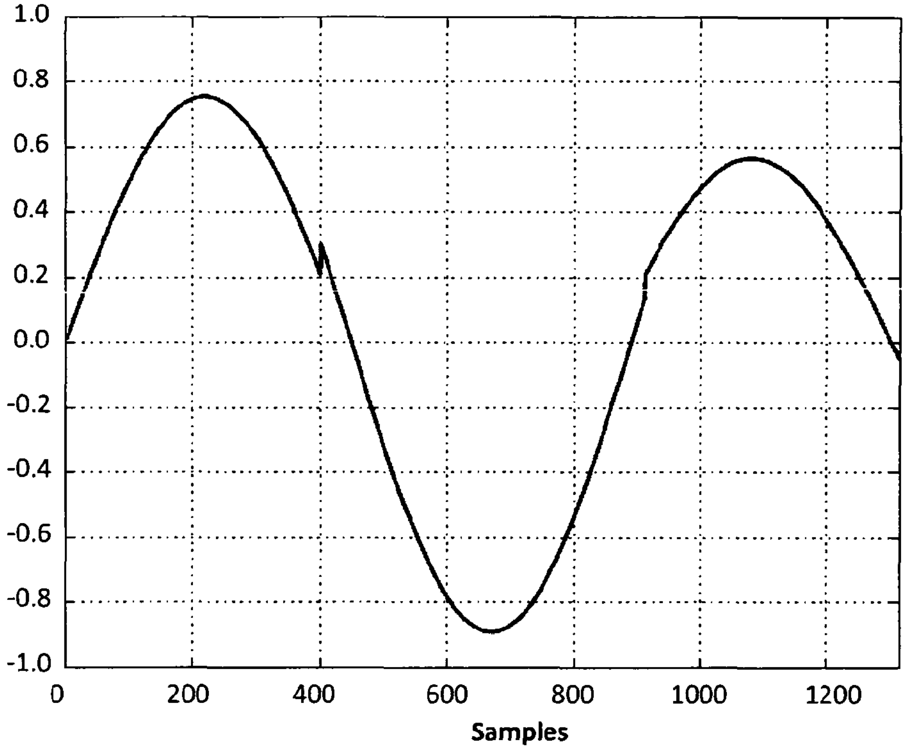
FIG. 22 shows a portion of a 50 Hz sine wave with discontinuities due to time-varying filtering.

$H_{centre}[f]$ is updated for every block, i.e. it is a time varying filter. This type of filter introduces distortion which can be audible if the discontinuities between blocks are too large. FIG. 22 shows an example of such a case where discontinuities can be observed in a portion of a 50 Hz sine wave around samples 400 and 900.

Two means to reduce the distortion are applied in the present implementation.

Figure 23:
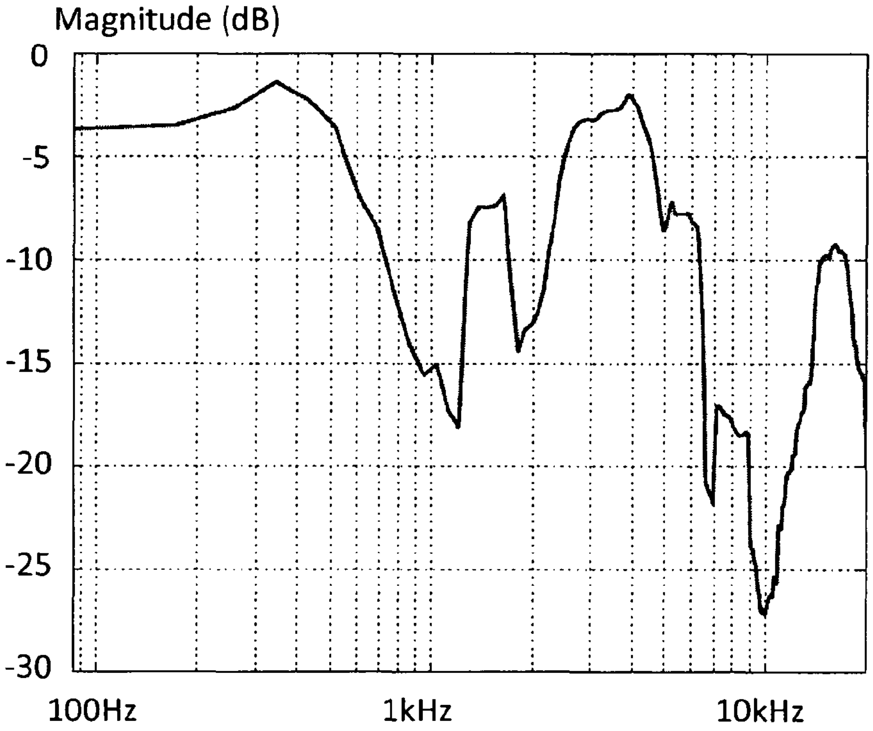
FIG. 23 shows the ⅓ octave smoothed magnitude of $H_{center}(f)$.

First across-frequency smoothing is applied to $H_{centre}[f]$. This reduces the sharp changes in filter magnitude of adjacent frequency bins. This smoothing is implemented by replacing the magnitude of each frequency bin with the mean of the magnitudes ⅓ of an octave to either side of it resulting in the filter shown in FIG. 23. Note that the scale of the y-axis is changed compared with FIG. 21.

Figure 24:
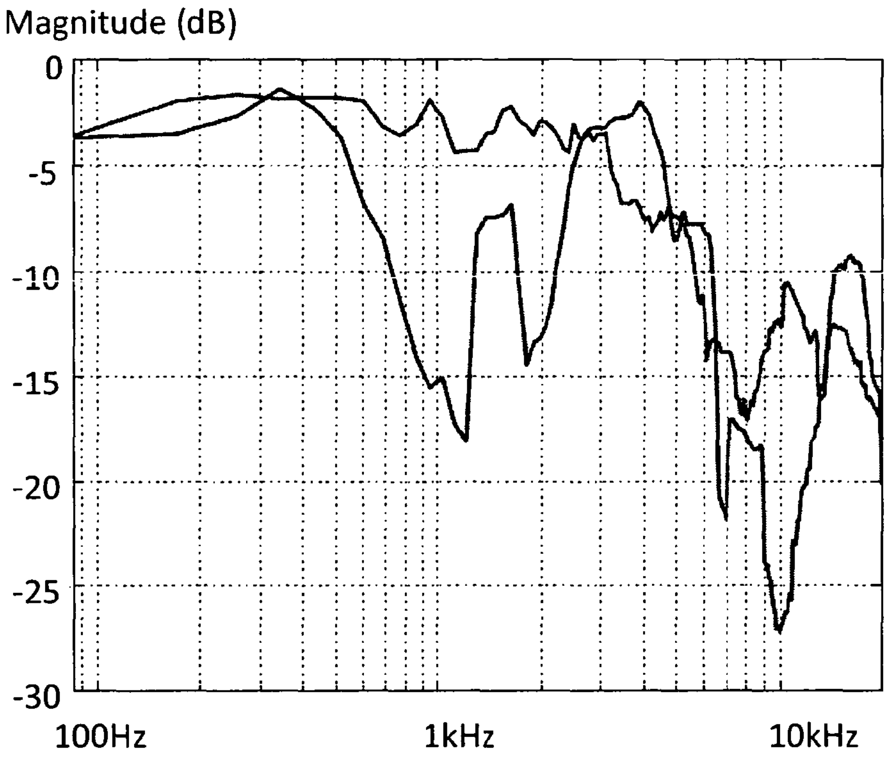
FIG. 24 shows the magnitude of $H_{center}(f)$ for two adjacent analysis blocks.

Slew rate limiting is also applied to the magnitude of each frequency bin from one block to the next. FIG. 24 shows $H_{centre}[f]$ for the present block and the previous block. Magnitude differences of approximately 15 dB can be seen around 1 kHz and 10 kHz.

The magnitude of these differences will cause audible distortion that sounds like clicking. The slew rate limiting is implemented with a conditional logic statement, an example of which is given in the pseudo-code below.

Algorithm 1 (Pseudo-Code for Limiting the Slew Rate of the Filter):

```
if new value > (old value + maximum positive change) then
    new value = (old value + maximum positive change)
else
    if new value < (old value − maximum negative change) then
        new value = (old value − maximum negative change)
    end if
end if
```

Figure 25:
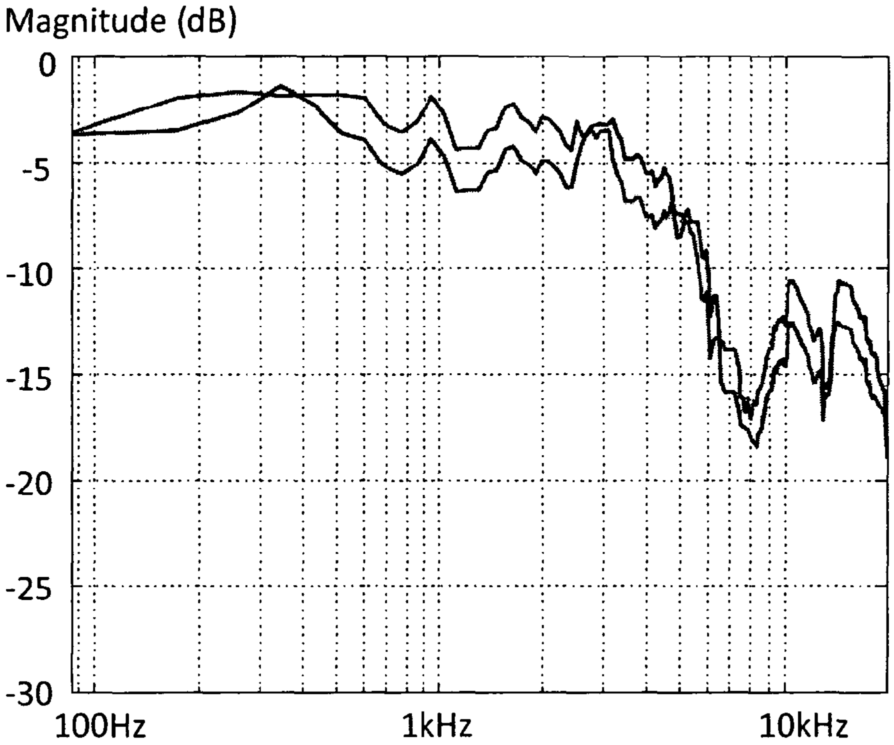
FIG. 25 shows the magnitude of $H_{center}(f)$ for two adjacent analysis blocks after slew rate limiting.

Choosing the values of maximum positive and negative change is a trade-off between distortion and having a filter that reacts quickly enough to represent the most important time-varying nature of the relationship between $l_{source}[n]$ and $r_{source}[n]$. The values were in this example determined empirically and 1.2 dB was found to be acceptable. FIG. 25 shows the change between $H_{centre}[f]$ for the present block and the previous block using this 1.2 dB slew rate limit.

Figure 26:
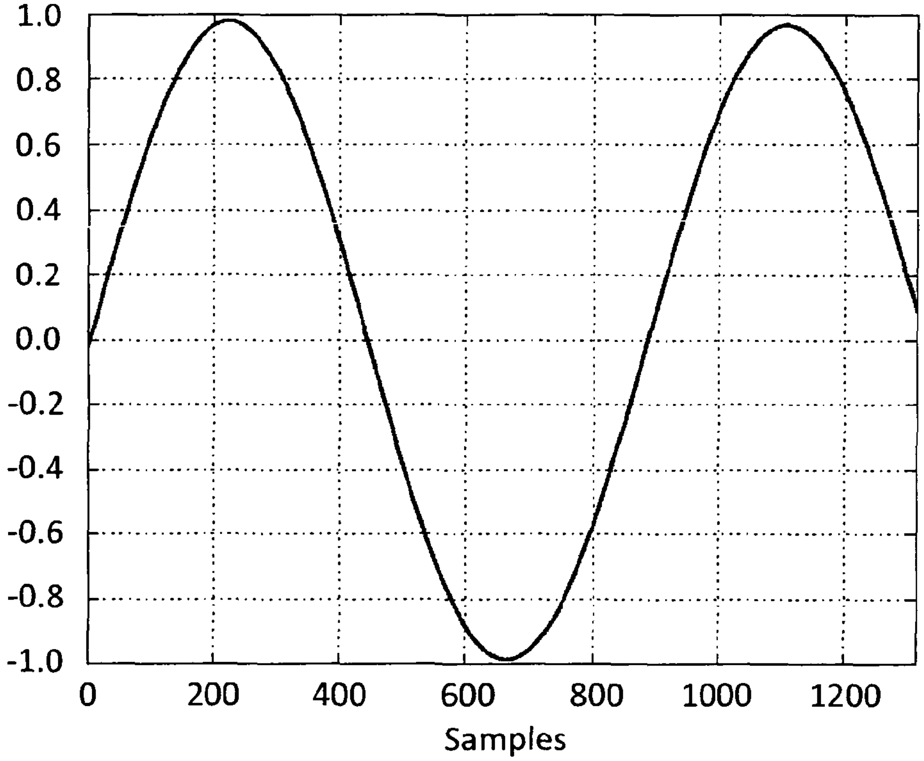
FIG. 26 shows a portion of a 50 Hz sine wave with reduced discontinuities due to slew rate limiting.

Consider again the regions around 1 kHz and 10 kHz. It is clear that only the differences up to the slew rate limit have been preserved. FIG. 26 shows the same portion of a 50 Hz sine wave where across-frequency-smoothing and slew rate limiting has been applied to the time varying filter. The discontinuities that were clearly visible in FIG. 22 are greatly reduced. The fact that the gain of the filters has also changed at this frequency is also clear from the fact that the level of the sine wave has changed. As mentioned above there is a trade-off between accuracy representing the inter-channel relationships in the source material and avoiding artefacts from the time-varying filter.

If fast-convolution is to be used, which is equivalent to circular convolution, the filters must be converted to their time-domain forms so that time-aliasing can be properly controlled (this will be more thoroughly described below).

The inverse discrete Fourier transform, abbreviated IDFT and given by the following equation and referred to as the Fourier synthesis equation of $H_{centre}[k]$ yields its impulse response.

$$h_{center}[n] = \frac{1}{N}\sum_{k=0}^{N-1} H_{center}[k]e^{-j(2\pi/N)kn}$$

Figure 27:
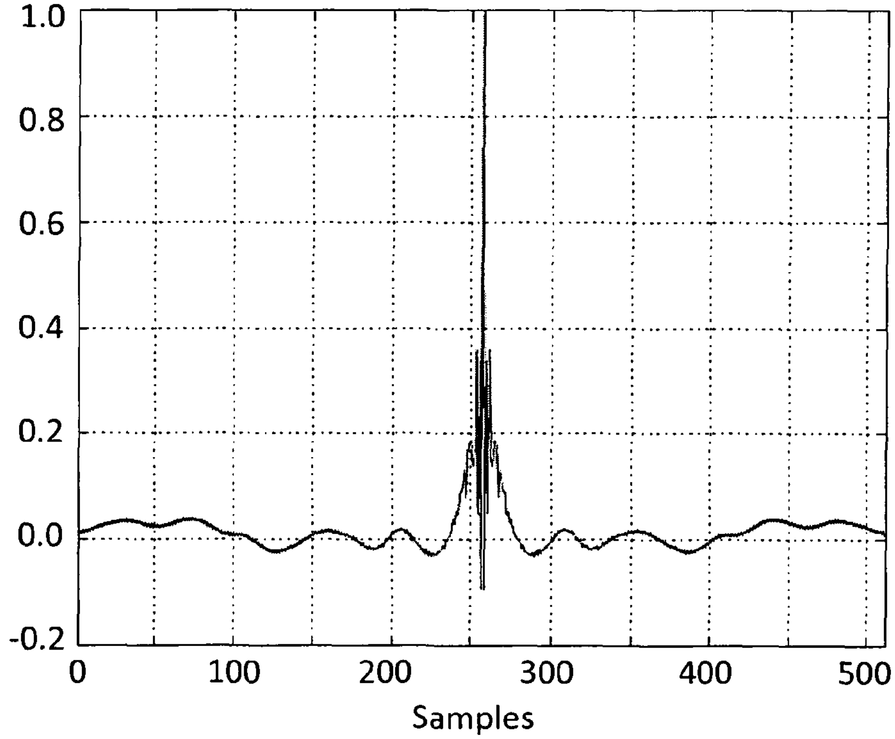
FIG. 27 shows the impulse response of $H_{center}(k)$.

As $H_{center}[f]$ is linear phase, $H_{center}[n]$ is an acausal finite impulse response (FIR) filter, N samples long, which means that it precedes the first sample. This type of filter can be made causal by applying a delay of N/2 samples as shown in FIG. 27. Note that the filter is symmetrical about sample N/2+1. The tap values have been normalised for plotting purposes only.

Function E: Calculate Signals for Each Loudspeaker

Fast Convolution Using the Overlap-Save Method

Figure 28:
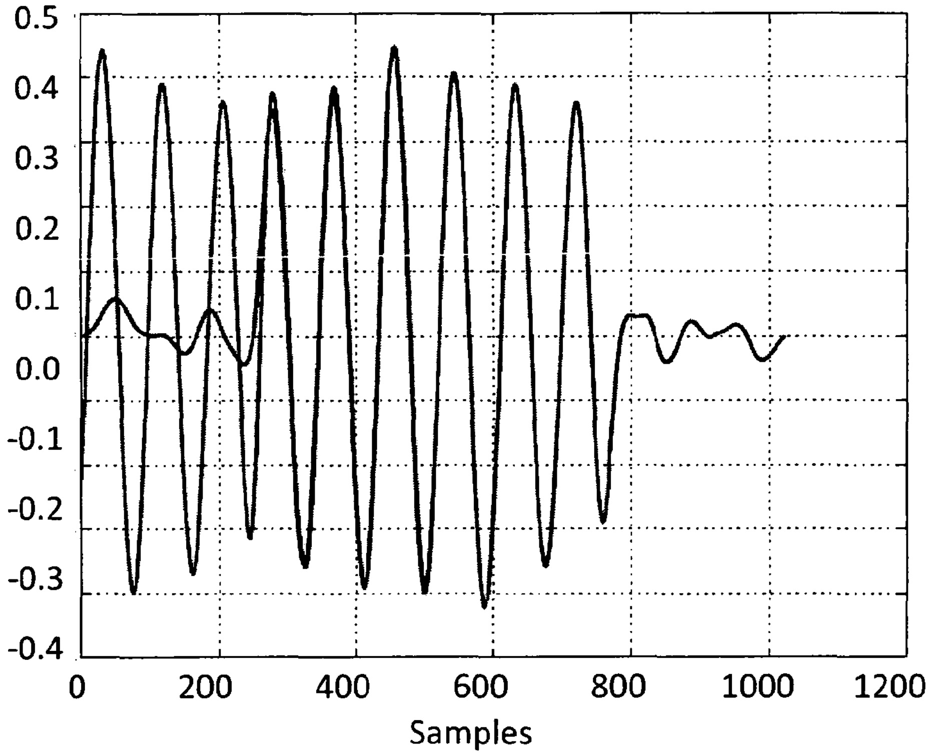
FIG. 28 shows (a) the output of linear convolution, and (b) output of circular convolution.

The time to convolve two sequences in the time domain is proportional to $N^2$ where N is the length of the longest sequence. Whereas the time to convolve two sequences in the frequency domain, that is the product of their frequency responses, is proportional to NlogN. This means that for sequences longer than approximately 64 samples, frequency domain convolution is computationally more efficient and hence the phrase fast convolution. There is an important difference in the output of the two methods—frequency domain convolution is circular. The curve shown in heavy line in FIG. 28 is the output sequence of the time domain convolution of the filter in FIG. 27, length N=512, with a 500 Hz sine wave, length M=512. Note the 256 sample pre-ringing that is a consequence of making causal the linear phase filter. In this case the output sequence is (N+M)−1=1023 samples long. The light curve shown in FIG. 28 is the output sequence of fast convolution of the same filter and sine wave and is only 512 samples long. The samples that should come after sample 512 have been circularly shifted and added to samples 1 to 511, which phenomenon is known as time-aliasing.

Figure 29:
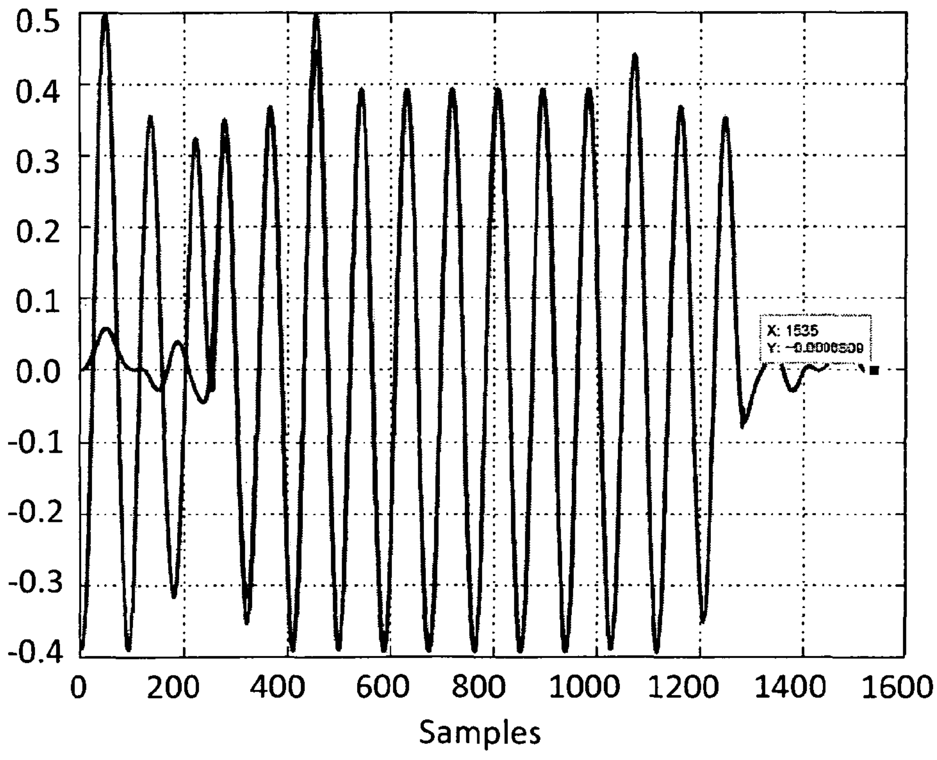
FIG. 29 shows (a) the output of linear convolution, and (b) output of circular convolution with zero padding.

Time-aliasing can be avoided by zero padding the sequence before the Fourier transform and that is the reason of returning to a time domain representation of the filters mentioned in the section about Function Block D above. The heavy curve in FIG. 29 is the output sequence of the time domain convolution of the filter in FIG. 27, length N=512, with a 500 Hz sine wave, length M=1024. In this case the output sequence is (N+M)−1=1535 samples long. The light curve in FIG. 29 is the output sequence of fast convolution of the same filter zero padded to a length N=1024 samples and sive wave still with length M=1024. Here the output sequence is 1024 samples long, however, in contrast to the case above, the portion of the output sequence in the same position as the zero padding, samples 512 to 1024, is identical to the output of the time domain convolution.

Saving this portion and repeating the process by shifting 512 samples ahead along the sine wave is called the overlap-save method of fast convolution and is equivalent to time domain convolution with the exception of the additional 256 sample delay making the total delay associated with the filtering process filter_delay=512 samples. Reference is made to Oppenheim and Schafer [1999, p. 587] for a thorough explanation of this technique.

Calculation of Output Signals

The signal to be reproduced by the Centre loudspeaker, $c_{output}[n]$, is calculated using the following equations:

$$l_{filtered}[n] = \left(\frac{1}{N}\sum_{k=0}^{N-1} H_{center}[k]\cdot L_{source}[k]e^{-j(2\pi/N)kn}\right)$$

-continued $$r_{filtered}[n] = \left(\frac{1}{N}\sum_{k=0}^{N-1} H_{center}[k]\cdot R_{source}[k]e^{-j(2\pi/N)kn}\right)$$

$$c_{output}[n] = l_{filtered}[n] + r_{filtered}[n]$$

The signals to be reproduced by the Left and Right loudspeakers, respectively, are then calculated by subtracting $c_{output}[h]$ from $l_{source}[n]$ and $r_{source}[n]$, respectively, as shown in the equation below. Note that $l_{source}[n]$ and $r_{source}[n]$ are delayed to account for the filter delay filter_delay.

$$l_{output}[n]=Z^{-filter\_delay}\cdot l_{source}[n]-l_{filtered}[n]$$

$$r_{output}[n]=Z^{-filter\_delay}\cdot r_{source}[n]-r_{filtered}[n]$$

In the special case where $r_{source}[n]=-l_{source}[n]$, the signals are negatively correlated, and it is easy to show that all the output signals will be zero. In this case the absolute value of the phase of the cross-power spectral density, $P_{LR}[k]$, will be equal to $\pi\forall k$ and the coherence, $C_{LR}[k]$, will be equal to $1\forall k$. The conditional statement in the pseudo-code below is applied to ensure the $l_{output}[n]=l_{source}[n]$, $r_{output}[n]=-l_{source}[n]$ and $c_{output}[h]=0$.

Algorithm 2 (Pseudo-Code for Handling Negatively Correlated Signals):

```
if C_LR[k] = 1 AND |phase(P_LR[k])|/π = 1 then
    C_LR[k] = 0
end if
```

Also in the case of silence on either $l_{source}[n]$ or $r_{source}[n]$, then $C_{LR}[k]$ should be zero. However, there can be numerical problems that prevent this from happening. In the present implementation, if the value of either $P_{LL}[k]$ or $P_{RR}[k]$ falls below −140 dB, then $C_{LR}[k]$ is set to zero.

REFERENCES

[1] Albert S. Bregman. *Auditory Scene Analysis*. The MIT Press, Cambridge, Mass., 1994.

[2] Søren Bech. *Spatial aspects of reproduced sound in small rooms*. J. Acoust. Soc. Am., 103: 434-445, 1998.

[3] Jens Blauert. *Spatial Hearing*. MIT Press, Cambridge, Mass., 1994.

[4] D. Hammershøi and H. Møller. Sound transmission to and within the human ear canal. J. Acoust. Soc. Am., 100(1); 408-427, 1996.

[5] CIPIC Interface Laboratory. *The cipic hrtf database*, 2004.

[6] Allan V. Oppenheim and Ronald W. Schafer. *Discrete-Time Signal Processing*. Prentice-Hall, Upper Saddle River, 1999.

[7] H. Tokuno, O. Kirkeby, P. A. Nelson and H. Hamada. *Inverse filter of sound reproduction systems using regularization*. IEICE Trans. Fundamentals, E80-A(5): 809-829, May 1997.

[8] S. Perkin, G. M. Mackay, and A. Cooper. *How drivers sit in cars*. Accid. Anal. And Prev., 27(6): 777-783, 1995.

The invention claimed is:

1. A method for selecting auditory signal components for reproduction in a loudspeaker setup having one or more physical supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, the method comprising the steps of:

(i) specifying an azimuth angle range within which one of said physical supplementary sound reproducing transducers is located or is to be located;

(ii) based on said azimuth angle range, determining left and right interaural level difference limits and left and right interaural time difference limits from the binaural impulse responses for a source at each extreme azimuthal angle, respectively;

(iii) providing a pair of input signals for said pair of primary sound reproducing transducers;

(iv) pre-processing each of said input signals with binaural impulse responses for the pair of primary sound reproducing transducers, thereby providing a pair of pre-processed input-signals;

(v) determining interaural level difference and interaural time difference as a function of frequency between said pre-processed signals; (vi) providing those signal components of said input signals that have interaural level differences and interaural time differences in the interval between said left and right interaural level difference limits, and left and right interaural time difference limits, respectively, to the corresponding physical supplementary sound reproducing transducer; and (vii) reproducing said signal components in said physical supplementary sound reproducing transducers.

2. A method according to claim 1, wherein those signal components that have interaural level and time differences outside said limits are provided to said left and right primary sound reproducing transducers, respectively.

3. A method according to claim 1, wherein those signal components that have interaural differences outside said limits are provided as input signals to means for carrying out the method according to claim 1.

4. A method according to claim 1, wherein said binaural impulse responses comprise head-related transfer functions.

5. A method according to claim 1, further comprising determining the coherence between said pair of input signals, and wherein said signal components are weighted by the coherence before being provided to said one or more supplementary sound reproducing transducers.

6. A method according to claim 1, wherein the frontal direction relative to a listener, and hence the respective processing by said pre-processing means is chosen by the listener.

7. A method according to claim 1, wherein the frontal direction relative to a listener, and hence the respective processing by said pre-processing means is controlled by means of head-tracking means attached to a listener.

8. A device for selecting auditory signal components for reproduction in a loudspeaker setup having one or more physical supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, the device comprising:

(i) specification means for specifying an azimuth angle range within which one of said physical supplementary sound reproducing transducers is located or is to be located, (ii) determining means that based on said azimuth angle range determine left and right interaural level difference limits and left and right interaural time difference limits, respectively from the binaural impulse responses for a source at each extreme azimuthal angle;

(iii) left and right input terminals providing a pair of input signals for said pair of primary sound reproducing transducers;

(iv) pre-processing means for pre-processing each of said input signals provided on said left and right input terminals with binaural impulse responses for the pair of primary sound reproducing transducers, thereby providing a pair of pre-processed input signals;

(v) determining means for determining interaural level difference and interaural time difference as a function of frequency between said pre-processed input signals; and (vi) signal processing means for providing those signal components of said input signals that have interaural level differences and interaural time differences in the interval between said left and right interaural level difference limits, and left and right interaural time difference limits, respectively, to a supplementary output terminal for provision to the corresponding physical supplementary sound reproducing transducer.

9. A device according to claim 8, wherein those signal components that have interaural level and time differences outside said limits are provided to said left and right primary sound reproducing transducers, respectively.

10. A device according to claim 8, wherein those signal components that have interaural differences outside said limits are provided as input.

11. A device according to claim 8, wherein said binaural impulse responses comprise head-related transfer functions.

12. A device according to claim 8 further comprising coherence determining means determining the coherence between said pair of input signals, and wherein said signal components of the input signals are weighted by the inter-channel coherence between the input signals before being provided to said one or more physical supplementary sound reproducing transducers via said supplementary output terminal.

13. A device according to claim 8, wherein the frontal direction relative to a listener, and hence the respective processing by said pre-processing means is chosen by the listener.

14. A device according to claim 8, wherein the frontal direction relative to a listener, and hence the respective processing by said pre-processing means is controlled by means of head-tracking means attached to a listener or other means for determining the orientation of the listener relative to the set-up of sound reproducing transducers.

15. A system for selecting auditory signal components for reproduction by means of one or more physical supplementary sound reproducing transducers, such as loudspeakers, placed between a pair of primary sound reproducing transducers, such as left and right loudspeakers in a stereophonic loudspeaker setup or adjacent loudspeakers in a surround sound loudspeaker setup, the system comprising at least two of the devices according to claim 9, wherein a first of said devices is provided with first left and right input signals, and wherein the first device provides output signals on a left output terminal, a right output terminal and a supplementary output terminal, the output signal on the supplementary output terminal being provided to a physical supplementary sound reproducing transducer, and the output signals on the left and right output signals, respectively, are provided to respective input signals of a subsequent device according to claim 8, whereby output signals are provided to respective of a number of physical supplementary sound reproducing transducers.

16. The system of claim 15, wherein the physical supplementary sound reproducing transducers are physical loudspeakers, and wherein the pair of primary sound reproducing transducers are left and right loudspeakers in a stereophonic loudspeaker setup or adjacent loudspeakers in a surround sound loudspeaker setup.

17. The method of claim 1, wherein the physical supplementary sound reproducing transducers are physical loudspeakers, and wherein the pair of primary sound reproducing transducers are left and right loudspeakers in a stereophonic loudspeaker setup, and wherein the step of reproducing said signal components in said physical supplementary sound reproducing transducers comprises reproducing said signal components in said physical loudspeakers.

18. The method of claim 1, wherein the physical supplementary sound reproducing transducers are physical loudspeakers, and wherein the pair of primary sound reproducing transducers are adjacent loudspeakers in a surround sound loudspeaker setup, and wherein the step of reproducing said signal components in said physical supplementary sound reproducing transducers comprises reproducing said signal components in said physical loudspeakers.

19. The device of claim 8, wherein the physical supplementary sound reproducing transducers are physical loudspeakers, and wherein the pair of primary sound reproducing transducers are left and right loudspeakers in a stereophonic loudspeaker setup.

20. The device of claim 8, wherein the physical supplementary sound reproducing transducers are physical loudspeakers, and wherein the pair of primary sound reproducing transducers are adjacent loudspeakers in a surround sound loudspeaker setup.

21. The method according to claim 1, wherein a listening direction is specified for auditory rotation of the loudspeaker setup, and wherein said left and right interaural level difference limits and left and right interaural time difference limits are determined also based on said listening direction.

22. The device according to claim 8, wherein said specification means are also for specifying a listening direction, and wherein said determining means determine left and right interaural level difference limits and left and right interaural time difference limits also based on said listening direction.

* * * * *